United States Patent
Fan et al.

(10) Patent No.: US 12,273,952 B2
(45) Date of Patent: Apr. 8, 2025

(54) METHOD FOR DRX IN UNLICENSED BAND AND TERMINAL APPARATUS

(71) Applicant: Huawei Technologies Co., Ltd., Shenzhen (CN)

(72) Inventors: Weiwei Fan, Shanghai (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 503 days.

(21) Appl. No.: 17/827,349

(22) Filed: May 27, 2022

(65) Prior Publication Data

US 2022/0295595 A1    Sep. 15, 2022

Related U.S. Application Data

(63) Continuation of application No. PCT/CN2020/132804, filed on Nov. 30, 2020.

(30) Foreign Application Priority Data

Nov. 30, 2019  (CN) .......................... 201911209066.0

(51) Int. Cl.
*H04W 52/02*   (2009.01)
*H04W 76/28*   (2018.01)

(52) U.S. Cl.
CPC ....... *H04W 76/28* (2018.02); *H04W 52/0216* (2013.01); *H04W 52/0248* (2013.01)

(58) Field of Classification Search
CPC ............. H04W 76/28; H04W 52/0216; H04W 52/0248
See application file for complete search history.

(56) References Cited

U.S. PATENT DOCUMENTS

| 2016/0337975 | A1* | 11/2016 | Li ..................... H04W 52/0238 |
| 2019/0215897 | A1  | 7/2019  | Babaei et al. |
| 2024/0389025 | A1* | 11/2024 | Xu .................... H04W 52/0216 |

FOREIGN PATENT DOCUMENTS

| CN | 101883370 A | 11/2010 |
| CN | 110278564 A | 9/2019 |

(Continued)

OTHER PUBLICATIONS

"Discussion on DRX for NR-U," 3GPP TSG-RAN WG2 Meeting 107bis, Chongqing, China, R2-1913031, Total 6 pages, 3rd Generation Partnership Project, Valbonne, France (Oct. 14-18, 2019).

(Continued)

*Primary Examiner* — Melvin C Marcelo
(74) *Attorney, Agent, or Firm* — Leydig, Voit & Mayer, Ltd.

(57) ABSTRACT

This application provides a terminal apparatus and method for discontinuous reception (DRX) in an unlicensed band, and may be applied to a scenario in which a terminal device performs communication through a sidelink or a Uu link. A signal receive end monitors a sidelink signal and/or a downlink signal on a grant-free resource configured by a network device, and switches between a non-DRX mode and a DRX mode when a corresponding preset condition is met. Alternatively, a transmit end directly indicates a receive end to use a DRX mode or a non-DRX mode, or indirectly indicates, with assistance of a network device, a receive end to use a DRX mode or a non-DRX mode. In this way, DRX of the receive end can be implemented in a sidelink unlicensed band or a Uu link unlicensed band. This reduces power consumption of the receive end.

18 Claims, 10 Drawing Sheets

(56) References Cited

FOREIGN PATENT DOCUMENTS

| EP | 3091772 A1 | * | 11/2016 | ............ H04W 16/14 |
|---|---|---|---|---|
| EP | 4061064 A1 | * | 9/2022 | ........ H04W 52/0216 |
| GB | 2623998 A | * | 5/2024 | ........ H04W 52/0216 |
| WO | 2018107369 A1 | | 6/2018 | |
| WO | WO-2021104521 A1 | * | 6/2021 | ........ H04W 52/0216 |

OTHER PUBLICATIONS

"User plane aspects for NR-based access to unlicensed specturm," 3GPP TSG-RAN WG2 Meeting 101bis, Sanya, China, R2-1805817, Total 4 pages, 3rd Generation Partnership Project, Valbonne, France (Apr. 16-20, 2018).

"Impacts on MAC for NR-U operation," 3GPP TSG RAN WG2 NR #103 Meeting, Gothenburg, Sweden, R2-1811282, Total 3 pages, 3rd Generation Partnership Project, Valbonne, France (Aug. 20-24, 2018).

* cited by examiner

METHOD FOR DRX IN UNLICENSED BAND AND TERMINAL APPARATUS

CROSS-REFERENCE TO RELATED APPLICATIONS

This application is a continuation of International Application No. PCT/CN2020/132804, filed on Nov. 30, 2020, which claims priority to Chinese Patent Application No. 201911209066.0, filed on Nov. 30, 2019. The disclosures of the aforementioned applications are hereby incorporated by reference in their entireties.

TECHNICAL FIELD

This application relates to the field of wireless communication technologies, and more specifically, to a method for discontinuous reception (DRX) in an unlicensed band and a terminal apparatus.

BACKGROUND

Compared with long term evolution (LTE), new radio (NR) supports a higher data transmission rate. In an unlicensed band, a transmit end can send data to a receive end only after listen before talk (LBT) succeeds. To avoid a data loss, the receive end usually continuously monitors a channel. However, a battery life of a terminal device has great impact on user experience. Continuous channel monitoring inevitably causes high power consumption of the terminal device, resulting in impact on the battery life of the terminal device. Therefore, how to reduce the power consumption of the terminal device becomes an urgent problem to be resolved.

SUMMARY

This application provides a method for DRX in an unlicensed band and a terminal apparatus, so that power consumption of a terminal device that works in an unlicensed band can be reduced by configuring the terminal device to use a special channel monitoring mechanism while ensuring communication efficiency.

According to a first aspect, this application provides a method for DRX in an unlicensed band. In the method, a first terminal apparatus monitors P grant-free resource units in a non-DRX mode, where the non-DRX mode is that the first terminal apparatus performs signal monitoring in first monitoring duration of the P grant-free resource units. The first terminal apparatus switches from the non-DRX mode to a DRX mode in a case in which the first terminal apparatus does not detect, in the P consecutive grant-free resource units, a sidelink signal corresponding to the first terminal apparatus and/or a downlink signal corresponding to the first terminal apparatus, where the grant-free resource units each include second monitoring duration and sleep duration in the DRX mode, the DRX mode is that the first terminal apparatus performs signal monitoring in the second monitoring duration, and stops monitoring in the sleep duration in a case in which the first terminal apparatus does not detect, in the second monitoring duration, the sidelink signal corresponding to the first terminal apparatus and/or the downlink signal corresponding to the first terminal apparatus, $P \geq 1$, and P is an integer.

In this technical solution, a receive end device (corresponding to the first terminal apparatus) that supports a sidelink performs signal monitoring on a grant-free resource configured by a network device. The receive end device actively switches from the non-DRX mode to the DRX mode in a case in which the receive end device does not detect a sidelink signal and/or a downlink signal of the receive end device in the P consecutive grant-free resource units.

The receive end device monitors, in an unlicensed band, whether there is a sidelink signal and/or a downlink signal of the receive end device, and switches from the non-DRX mode to the DRX mode when a switching condition is met. In this way, the receive end device does not need to continuously monitor the grant-free resource, so that power consumption is reduced.

Embodiments of this application may be used in a sidelink scenario based on an unlicensed band, or may be used in a Uu link scenario based on an unlicensed band.

With reference to the first aspect, in some implementations of the first aspect, the case in which the first terminal apparatus does not detect a sidelink signal corresponding to the first terminal apparatus and/or a downlink signal corresponding to the first terminal apparatus is one or more of the following:

the first terminal apparatus detects, in the P consecutive grant-free resource units, the sidelink signal corresponding to the first terminal apparatus and/or the downlink signal corresponding to the first terminal apparatus, and a destination address of the sidelink signal and/or a destination address of the downlink signal are/is different from an address of the first terminal apparatus; or the first terminal apparatus does not detect, in the P consecutive grant-free resource units, the sidelink signal corresponding to the first terminal apparatus and/or the downlink signal corresponding to the first terminal apparatus, and received signal strength of the P consecutive grant-free resource units is less than a preset threshold.

In a scenario in which a communication device performs communication in the unlicensed band, that the receive end device does not detect the sidelink signal or the downlink signal may not indicate that a transmit end device has no signal to send. For example, the transmit end device may fail to send a signal due to an LBT failure. In consideration of this, when the receive end performs signal monitoring on the grant-free resource configured by the network device, in addition to determining that the sidelink signal or the downlink signal is not detected, the receive end device further needs to determine signal received energy on the grant-free resource units in the case in which the receive end device does not detect the sidelink signal and/or the downlink signal. In this way, the following case can be avoided: When the transmit end device fails to send a signal due to the LBT failure, the receive end device incorrectly determines that the transmit end device has no signal to send, and incorrectly switches to the DRX mode, resulting in a signal or data loss. Therefore, accuracy of determining a signal transmission status of the transmit end by the receive end can be improved.

With reference to the first aspect, in some implementations of the first aspect, after that the first terminal apparatus switches from the non-DRX mode to a DRX mode, the method further includes: The first terminal apparatus monitors the grant-free resource units in the DRX mode. The first terminal apparatus switches from the DRX mode to the non-DRX mode in a case in which the first terminal apparatus detects, in the second monitoring duration, the sidelink signal corresponding to the first terminal apparatus and/or the downlink signal corresponding to the first terminal apparatus.

With reference to the first aspect, in some implementations of the first aspect, the grant-free resource units each include a plurality of time units in time domain, the second monitoring duration includes a part of the plurality of time units, and the time unit is any one of the following: a millisecond, a symbol, or a slot.

According to a second aspect, this application provides a method for DRX in an unlicensed band. The method includes: A first terminal apparatus receives first indication information, where the first indication information indicates the first terminal apparatus to use a non-DRX mode or a DRX mode, the non-DRX mode is that the first terminal apparatus performs signal monitoring in first monitoring duration of a grant-free resource unit, and the DRX mode is that the first terminal apparatus performs signal monitoring in second monitoring duration of the grant-free resource unit, and stops monitoring in sleep duration of the grant-free resource unit in a case in which the first terminal apparatus does not detect, in the second monitoring duration, a sidelink signal corresponding to the first terminal apparatus and/or a downlink signal corresponding to the first terminal apparatus. The first terminal apparatus uses the DRX mode or the non-DRX mode based on the first indication information.

A receive end device that performs communication through a sidelink switches between the DRX mode and the non-DRX mode based on the first indication information from a sidelink transmit end device. Alternatively, a transmit end device indicates, to a network device, that a receive end device uses a DRX mode or a non-DRX mode, and then the network device notifies, by using first indication information, the receive end device to use the DRX mode or the non-DRX mode. That is, DRX of the receive end device is implemented with assistance of a Uu link. In this way, power consumption of the receive end device can be reduced.

In addition, the sidelink transmit end actively indicates mode switching of the receive end, so that a switching delay that exists when the receive end determines mode switching by monitoring a signal of the transmit end in the method according to the first aspect can be avoided. Therefore, compared with the solution in the first aspect, the switching delay can be effectively reduced according to the method in the second aspect or any implementation of the second aspect.

With reference to the second aspect, in some implementations of the second aspect, the first indication information is carried in an SSB, RRC signaling, a MAC CE of a PDSCH, or DCI from the network device.

The network device may send the first indication information to the first terminal apparatus in a plurality of manners, so that indication flexibility is improved.

With reference to the second aspect, in some implementations of the second aspect, the first indication information is a first signal or a second signal, the first signal indicates the first terminal apparatus to use the DRX mode, and the second signal indicates the first terminal apparatus to use the non-DRX mode.

The two different signals are set, and each signal indicates the DRX mode or the non-DRX mode. Therefore, the first terminal apparatus may determine, through signal monitoring, to use the DRX mode or the non-DRX mode. In this implicit indication manner, additional signaling overheads caused by indicating the first terminal apparatus by using dedicated signaling can be avoided.

With reference to the second aspect, in some implementations of the second aspect, the first signal is a first DMRS, the second signal is a second DMRS, and the first DMRS and the second DMRS include different reference sequences.

With reference to the second aspect, in some implementations of the second aspect, before that a first terminal apparatus receives first indication information, the method further includes: The first terminal apparatus registers sidelink physical layer address information of the first terminal apparatus with the network device.

According to a third aspect, this application provides a method for DRX in an unlicensed band. The method includes: A second terminal apparatus sends first indication information or second indication information, where the first indication information or the second indication information indicates a first terminal apparatus to use a non-DRX mode or a DRX mode, the non-DRX mode is that the first terminal apparatus performs signal monitoring in first monitoring duration of a grant-free resource unit, and the DRX mode is that the first terminal apparatus performs signal monitoring in second monitoring duration of the grant-free resource unit, and stops monitoring in sleep duration of the grant-free resource unit in a case in which the first terminal apparatus does not detect, in the second monitoring duration, a sidelink signal corresponding to the first terminal apparatus and/or a downlink signal corresponding to the first terminal apparatus.

In this embodiment, the second terminal apparatus may directly send the first indication information to the first terminal apparatus, where the first indication information indicates the first terminal apparatus to use the DRX mode or the non-DRX mode.

Alternatively, a second terminal apparatus sends second indication information to a network device. The network device demodulates the second indication information, and learns of a DRX mode or a non-DRX mode indicated by the second terminal apparatus. Then, the network device sends first indication information to a first terminal apparatus, where the first indication information indicates the DRX mode or the non-DRX mode.

In this technical solution, with assistance of a Uu link, a sidelink transmit end (corresponding to the second terminal apparatus) indicates, through the network device, a receive end (corresponding to the first terminal apparatus) to use the DRX mode or the non-DRX mode. This can avoid the following disadvantage: The indication information that indicates mode switching of the first terminal apparatus cannot be sent in a timely manner because LBT performed by the transmit end on the sidelink fails. Therefore, the mode switching delay can be reduced.

With reference to the third aspect, in some implementations of the third aspect, the first indication information is carried in an SL-SSB or PC5-RRC signaling sent by the second terminal apparatus.

With reference to the third aspect, in some implementations of the third aspect, the second indication information is carried in a MAC CE of a PUSCH sent by the second terminal apparatus or a first-type PUCCH that fully occupies one slot in time domain.

With reference to the third aspect, in some implementations of the third aspect, the second indication information is a first signal or a second signal, the first signal indicates the first terminal apparatus to use the DRX mode, and the second signal indicates the first terminal apparatus to use the non-DRX mode.

With reference to the third aspect, in some implementations of the third aspect, the first signal is a first DMRS, the second signal is a second DMRS, and the first DMRS and the second DMRS include different reference sequences.

With reference to the third aspect, in some implementations of the third aspect, the first signal is a second-type first PUCCH, the second signal is a second-type second PUCCH, the first PUCCH and the second PUCCH include different reference sequences, and the second-type PUCCH does not fully occupy one slot in time domain.

With reference to the third aspect, in some implementations of the third aspect, the first signal is a first scheduling request SR, the second signal is a second SR, and the first SR and the second SR include different reference sequences.

With reference to the third aspect, in some implementations of the third aspect, before the second terminal apparatus sends the first signal or the second signal, the method further includes: The second terminal apparatus registers sidelink physical layer address information of the second terminal apparatus with the network device.

According to a fourth aspect, this application provides a method for DRX in an unlicensed band. The method includes: A network device receives second indication information from a second terminal apparatus, where the second indication information indicates a first terminal apparatus to use a non-DRX mode or a DRX mode, the non-DRX mode is that the first terminal apparatus performs signal monitoring in first monitoring duration of a grant-free resource unit, and the DRX mode is that the first terminal apparatus performs signal monitoring in second monitoring duration of the grant-free resource unit, and stops monitoring in sleep duration of the grant-free resource unit in a case in which the first terminal apparatus does not detect, in the second monitoring duration, a sidelink signal corresponding to the first terminal apparatus and/or a downlink signal corresponding to the first terminal apparatus. The network device sends first indication information to the first terminal apparatus based on the second indication information, where the first indication information indicates the non-DRX mode or the DRX mode.

The network device receives the second indication information from a sidelink transmit end (corresponding to the second terminal apparatus) through a Uu link, where the second indication information indicates a sidelink receive end (corresponding to the first terminal apparatus) to use the DRX mode or the non-DRX mode. Then, the network device sends the first indication information to the receive end through a Uu link, where the first indication information indicates the receive end to use the DRX mode or the non-DRX mode. In this technical solution, DRX of a receive end working in a sidelink unlicensed band can be implemented with assistance of the Uu link, so that power consumption of the receive end can be reduced.

Optionally, in this embodiment, the Uu link may work in a licensed band or an unlicensed band.

In an implementation, with assistance of a Uu link licensed band, the sidelink transmit end (corresponding to the second terminal apparatus) indicates, through the network device, the receive end (corresponding to the first terminal apparatus) to use the DRX mode or the non-DRX mode. Compared with the method according to the second aspect or the third aspect, this can avoid the following disadvantage: The first indication information that indicates mode switching of the first terminal apparatus cannot be sent in a timely manner because LBT performed by the transmit end (for example, the network device) on the sidelink fails. Therefore, a mode switching delay can be reduced.

With reference to the fourth aspect, in some implementations of the fourth aspect, the second indication information is carried in a MAC CE of a PUSCH from the second terminal apparatus or a first-type PUCCH.

The second terminal apparatus may indicate the DRX mode or the non-DRX mode to the network device in a plurality of manners, so that indication flexibility is improved.

With reference to the fourth aspect, in some implementations of the fourth aspect, the second indication information is a first signal or a second signal, the first signal indicates the first terminal apparatus to use the DRX mode, and the second signal indicates the first terminal apparatus to use the non-DRX mode. That the network device sends first indication information to the first terminal apparatus based on the second indication information, where the first indication information indicates the first terminal apparatus to use the non-DRX mode or the DRX mode includes: The network device receives the first signal from the second terminal apparatus, and sends the first indication information to the first terminal apparatus, where the first indication information indicates the DRX mode. Alternatively, the network device receives the second signal from the second terminal apparatus, and sends the first indication information to the first terminal apparatus, where the first indication information indicates the non-DRX mode.

The two different signals are set, and each signal indicates the DRX mode or the non-DRX mode. Therefore, the network device may determine, based on the signal from the second terminal apparatus, that the second terminal apparatus indicates the first terminal apparatus to use the DRX mode or the non-DRX mode, and then notify the first terminal apparatus by using the first indication information. In this implicit indication manner, additional signaling overheads and resource overheads caused when the second terminal apparatus indicates the network device by using dedicated signaling or indication information can be avoided.

With reference to the fourth aspect, in some implementations of the fourth aspect, the first signal is a second-type first PUCCH, the second signal is a second-type second PUCCH, and the first PUCCH and the second PUCCH include different reference sequences.

With reference to the fourth aspect, in some implementations of the fourth aspect, the first signal is a first scheduling request SR, the second signal is a second SR, and the first SR and the second SR include different reference sequences.

With reference to the fourth aspect, in some implementations of the fourth aspect, before that a network device receives second indication information from a second terminal apparatus, the method further includes: The network device receives first address information from the first terminal apparatus and second address information from the second terminal apparatus, where the first address information is sidelink physical layer address information of the first terminal apparatus, and the second address information is sidelink physical layer address information of the second terminal apparatus. That the network device sends first indication information to the first terminal apparatus based on the second indication information includes: The network device sends the first indication information to the first terminal apparatus corresponding to the first address information, where the first address information is determined by the network device based on address information of an air interface link physical layer on which the second indication information is received and a mapping relationship, and the mapping relationship records a correspondence among the first address information, the second address information, air interface link physical layer address information of the first terminal apparatus, and air interface link physical layer address information of the second terminal apparatus.

With reference to the fourth aspect, in some implementations of the fourth aspect, the first indication information is carried in DCI or a PDSCH sent by the network device.

According to a fifth aspect, this application provides a terminal apparatus. The terminal apparatus has a function of implementing the method according to any one of the first aspect, the second aspect, or the possible implementations of the first aspect and the second aspect. The function may be implemented by hardware, or may be implemented by hardware executing corresponding software. The hardware or the software includes one or more units corresponding to the foregoing function.

Optionally, the terminal apparatus is a terminal device.

Optionally, the terminal apparatus is a chip.

According to a sixth aspect, this application provides a terminal apparatus. The terminal apparatus has a function of implementing the method according to any one of the third aspect or the possible implementations of the third aspect. The function may be implemented by hardware, or may be implemented by hardware executing corresponding software. The hardware or the software includes one or more units corresponding to the foregoing function.

Optionally, the terminal apparatus is a terminal device.

Optionally, the terminal apparatus is a chip.

According to a seventh aspect, this application provides a communication apparatus. The communication apparatus has a function of implementing the method according to any one of the fourth aspect or the possible implementations of the fourth aspect. The function may be implemented by hardware, or may be implemented by hardware executing corresponding software. The hardware or the software includes one or more units corresponding to the foregoing function.

Optionally, the communication apparatus is a network device, for example, an access network device.

Optionally, the communication apparatus is a chip.

According to an eighth aspect, this application provides a terminal device. The terminal device includes one or more processors and one or more memories. The one or more memories are configured to store a computer program. The one or more processors are configured to invoke and run the computer program stored in the one or more memories, to enable the terminal device to perform the method according to any one of the first aspect, the second aspect, or the possible implementations of the first aspect and the second aspect.

According to a ninth aspect, this application provides a terminal device. The terminal device includes one or more processors and one or more memories. The one or more memories are configured to store a computer program. The one or more processors are configured to invoke and run the computer program stored in the one or more memories, to enable the terminal device to perform the method according to any one of the third aspect or the possible implementations of the third aspect.

According to a tenth aspect, this application provides a network device. The network device includes one or more processors and one or more memories. The one or more memories are configured to store a computer program. The one or more processors are configured to invoke and run the computer program stored in the one or more memories, to enable the network device to perform the method according to any one of the fourth aspect or the possible implementations of the fourth aspect.

According to an eleventh aspect, this application provides a chip. The chip includes one or more processors. The one or more processors are configured to read and execute a computer program stored in one or more memories, to perform the method according to any one of the first aspect, the second aspect, or the possible implementations of the first aspect and the second aspect. The one or more memories are independently disposed outside the chip.

Optionally, the chip further includes the one or more memories, and the one or more processors are connected to the one or more memories by using a circuit or a wire.

Further, optionally, the chip further includes a communication interface.

According to a twelfth aspect, this application provides a chip. The chip includes one or more processors. The one or more processors are configured to read and execute a computer program stored in one or more memories, to perform the method according to any one of the third aspect or the possible implementations of the third aspect. The one or more memories are independently disposed outside the chip.

Optionally, the chip further includes the one or more memories, and the one or more processors are connected to the one or more memories by using a circuit or a wire.

Further, optionally, the chip further includes a communication interface.

According to a thirteenth aspect, this application provides a chip. The chip includes one or more processors. The one or more processors are configured to read and execute a computer program stored in one or more memories, to perform the method according to any one of the fourth aspect or the possible implementations of the fourth aspect. The one or more memories are independently disposed outside the chip.

Optionally, the chip further includes the one or more memories, and the one or more processors are connected to the one or more memories by using a circuit or a wire.

Further, optionally, the chip further includes a communication interface.

The chip mentioned in the foregoing aspects may be a system on chip (SoC), a baseband chip, or the like.

According to a fourteenth aspect, this application further provides a computer program product. The computer program product includes computer program code. When the computer program code is run on a computer, the computer is enabled to perform the method according to any one of the first aspect, the second aspect, or the possible implementations of the first aspect and the second aspect.

According to a fifteenth aspect, this application further provides a computer program product. The computer program product includes computer program code. When the computer program code is run on a computer, the computer is enabled to perform the method according to any one of the third aspect or the possible implementations of the third aspect.

According to a sixteenth aspect, this application further provides a computer program product. The computer program product includes computer program code. When the computer program code is run on a computer, the computer is enabled to perform the method according to any one of the fourth aspect or the possible implementations of the fourth aspect.

According to a seventeenth aspect, this application further provides a computer-readable storage medium. The computer-readable storage medium stores computer instructions.

When the computer instructions are run on a computer, the computer is enabled to perform the method according to any one of the first aspect, the second aspect, or the possible implementations of the first aspect and the second aspect.

According to an eighteenth aspect, this application further provides a computer storage medium. The computer-readable storage medium stores computer instructions. When the computer instructions are run on a computer, the computer is enabled to perform the method according to any one of the third aspect or the possible implementations of the third aspect.

According to a nineteenth aspect, this application further provides a computer storage medium. The computer-readable storage medium stores computer instructions. When the computer instructions are run on a computer, the computer is enabled to perform the method according to any one of the fourth aspect or the possible implementations of the fourth aspect.

According to a twentieth aspect, this application further provides a communication apparatus. The communication apparatus includes a processor and an interface circuit. The interface circuit is configured to: receive computer code or instructions, and transmit the computer code or the instructions to the processor. The processor is configured to run the computer code or the instructions, to perform the method according to any one of the first aspect, the second aspect, or the possible implementations of the first aspect and the second aspect.

According to a twenty-first aspect, this application further provides a communication apparatus. The communication apparatus includes a processor and an interface circuit. The interface circuit is configured to: receive computer code or instructions, and transmit the computer code or the instructions to the processor. The processor is configured to run the computer code or the instructions, to perform the method according to any one of the third aspect or the possible implementations of the third aspect.

According to a twenty-second aspect, this application further provides a communication apparatus. The communication apparatus includes a processor and an interface circuit. The interface circuit is configured to: receive computer code or instructions, and transmit the computer code or the instructions to the processor. The processor is configured to run the computer code or the instructions, to perform the method according to any one of the fourth aspect or the possible implementations of the fourth aspect.

According to a twenty-third aspect, this application provides a wireless communication system. The wireless communication system includes one or more of the terminal device according to the eighth aspect, the terminal device according to the ninth aspect, and the network device according to the tenth aspect.

DESCRIPTION OF EMBODIMENTS

The following describes technical solutions of this application with reference to the accompanying drawings.

The technical solutions of this application are mainly used in wireless communication systems working in an unlicensed band, for example, a worldwide interoperability for microwave access (WiMAX) communication system, a 5th generation (5G) communication system or another communication system working in an unlicensed band, and a wireless communication system that is after 5G and that works in an unlicensed band.

A network device in this application includes but is not limited to an evolved NodeB (eNB), a radio network controller (RNC), a NodeB (NB), a base station controller (BSC), a base transceiver station (BTS), a home base station (home evolved NodeB, or home NodeB, or HNB), a baseband unit (BBU), an evolved LTE (eLTE) base station, an NR base station (next generation NodeB, or gNB), and the like. Alternatively, the network device may be a centralized unit (CU) or a distributed unit (DU).

A terminal device in this application includes but is not limited to any one of a user equipment (UE), a mobile station, an access terminal, a subscriber unit, a subscriber station, a mobile station, a remote station, a remote terminal, a mobile device, a terminal, a wireless communication device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a 5G network, a terminal device in a future evolved network, and the like. The vehicle-mounted device may alternatively be a vehicle-mounted communication module or another embedded communication module. The vehicle-mounted communication module may also be referred to as a vehicle-mounted terminal device or an on-board unit (OBU). The terminal device in embodiments of this application may alternatively be a vehicle-mounted module, a vehicle-mounted component, a vehicle-mounted chip, or a vehicle-mounted unit that is built into a vehicle as one or more components or units. The vehicle may implement a method in this application by using the built-in vehicle-mounted module, vehicle-mounted component, vehicle-mounted chip, or vehicle-mounted unit.

In addition, the terminal device may alternatively be a terminal device in a communication system such as a vehicle-to-everything (V2X) communication system, an intelligent connected vehicle (ICV) communication system, or an automatic driving communication system, or an assisted driving communication system, or may be a terminal device in a device to device (D2D) communication system.

Figure 1:
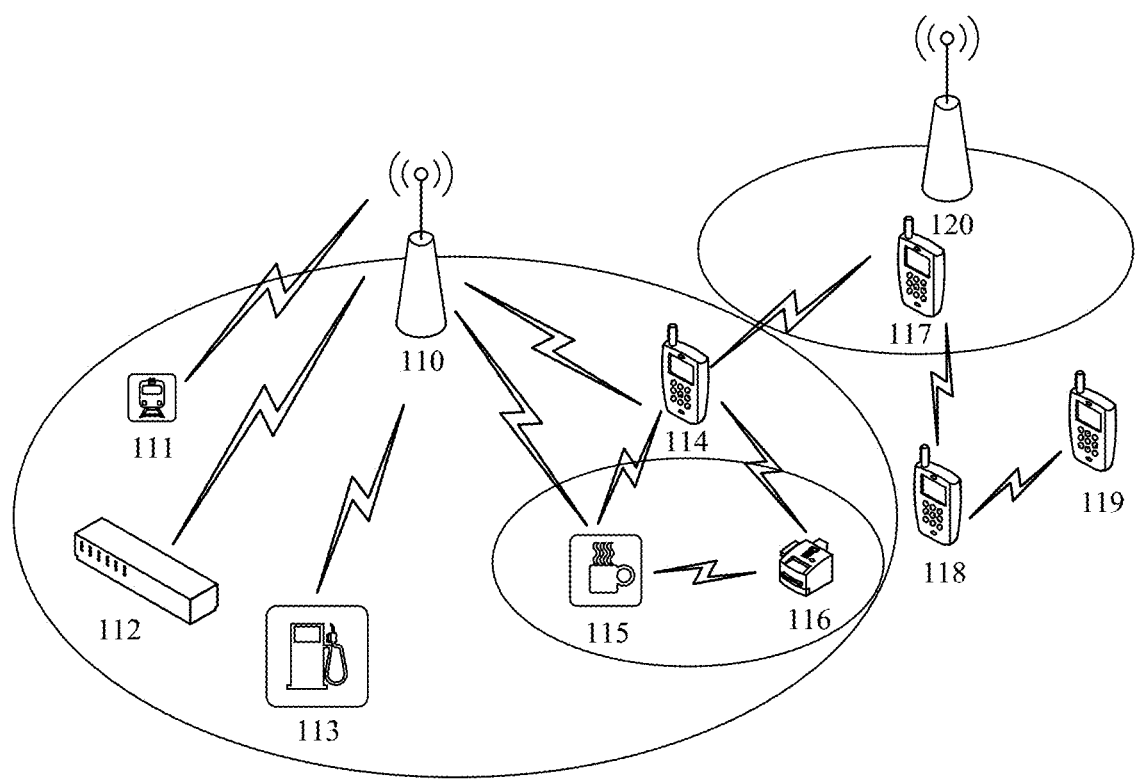
FIG. 1 shows an example of an architecture of a communication system to which an embodiment of this application is applicable.

FIG. 1 shows an example of an architecture of a communication system to which an embodiment of this application is applicable. As shown in FIG. 1, the wireless communication system may include at least one network device and at least one terminal device. The network devices are 110 and 120 shown in FIG. 1, and the terminal devices are 111 to 119 shown in FIG. 1.

Optionally, data may be transmitted between a network device and a terminal device through a Uu link. For example, transmission is performed between the network device 110 and the terminal devices 111, 112, 113, 114, and 115 through Uu links. The Uu link may work in a licensed band and/or an unlicensed band.

In addition, data may be further transmitted between terminal devices through a sidelink (SL). For example, data is transmitted between the terminal devices 114 and 115 and between the terminal devices 114 and 116 through sidelinks. The sidelink may also work in a licensed band or an unlicensed band.

It should be understood that FIG. 1 shows only an example. The wireless communication system may further include another network device.

In addition, data transmission between terminal devices mentioned in this specification may include a plurality of scenarios.

In a possible scenario, data is transmitted between two or more terminal devices in network coverage of the network device 110. For example, data is transmitted between 114 and 115, between 114 and 116, or between 115 and 116.

In another possible scenario, a terminal device that transmits data through a sidelink is located in network coverage of a network device, and another terminal device that transmits the data through the sidelink may be located outside the network coverage of the network device.

For example, the terminal device 114 is located in network coverage of the network device 110, and the terminal device 117 is located in network coverage of the network device 120. For example, data is transmitted between 114 and 117.

For another example, the terminal device 117 is located in network coverage of the network device 120, and no connection is established between the terminal device 118 and the network device 120.

In still another possible scenario, two terminal devices that transmit data through a sidelink may both be located outside coverage of the network device 120. In other words, no connection is established between the two terminal devices that transmit the data through the sidelink and the network device 120. For example, data is transmitted between 118 and 119.

In the foregoing scenario in which no connection is established between a terminal device and a network device, a connection may be established between two terminal devices by using a technology such as wireless fidelity (Wi-Fi) or Bluetooth.

For the foregoing different scenarios, in the technical solutions of this application, DRX of a receive end device can be implemented on a sidelink, to reduce power consumption of the receive end device.

It should be noted that, although the technical solutions of this application are intended to support a terminal device in implementing DRX on a sidelink, some embodiments involve assisting, through a Uu link, the terminal device in implementing DRX on the sidelink. An existing mechanism may be used for configuration and use of a grant resource corresponding to a Uu link. For example, the network device configures the grant resource for the terminal device. Under scheduling of the network device, the terminal device sends an uplink signal to the network device or receives a downlink signal from the network device by using the grant resource.

A person skilled in the art may understand that the receive end device or a transmit end device in this specification is defined from a perspective of a data transmission direction. For example, the receive end device is a party that receives a signal and/or data in two terminal devices that communicate with each other through a sidelink.

The following describes the technical solutions of this application in detail.

The network device configures a grant-free resource for two or more terminal devices that transmit data in an unlicensed band, and the terminal devices send and receive a sidelink signal on the grant-free resource configured by the network device.

The terminal devices are a terminal device that can support sidelink communication (referred to as a "sidelink terminal device" for ease of description) and/or a terminal device that supports wireless communication with the network device through a Uu link.

Optionally, the grant-free resource may be a periodic resource or an aperiodic resource. In an implementation, when the grant-free resource is the periodic resource, the grant-free resource may be a configured grant (CG) resource.

In an example, a sidelink grant-free resource unit may be specifically an aperiodic resource or a CG resource. A Uu link grant-free resource may be an aperiodic resource.

Optionally, in an implementation, the network device configures periodic grant-free resource units for the terminal devices. Two different grant-free resource units may have a same size or different sizes.

Optionally, in another implementation, the grant-free resource configured by the network device for the terminal devices may alternatively be grant-free resource units that are consecutive in time domain. When the grant-free resource units are consecutive in time domain, the grant-free resource is the aperiodic resource.

Figure 2A:
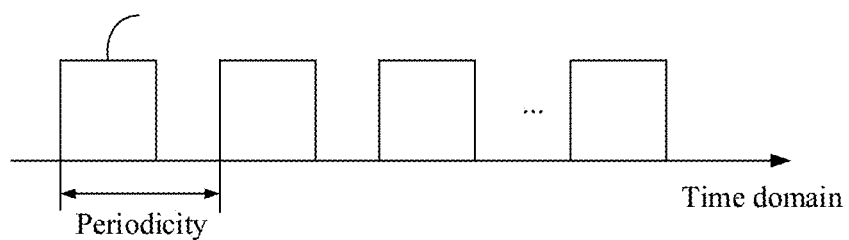
FIG. 2A and FIG. 2B are schematic diagrams of a grant-free resource according to an embodiment of this application.
Figure 2B:
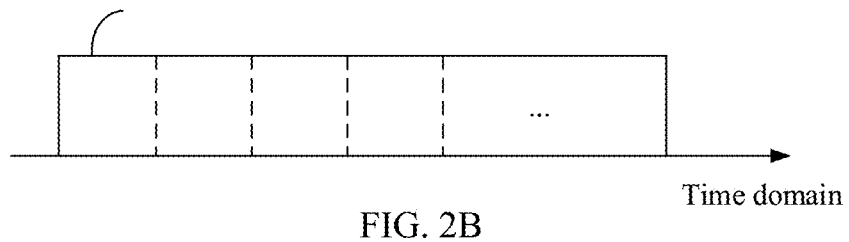

FIG. 2A and FIG. 2B are schematic diagrams of a grant-free resource according to an embodiment of this application. As shown in FIG. 2A, the grant-free resource may be a periodic resource. The periodic grant-free resource may include periodic grant-free resource units. A time interval between two grant-free resource units that are consecutive in time domain is greater than 0. A periodicity of a grant-free resource unit may be a time interval between start moments of two grant-free resource units that are consecutive in time domain, or may be a time interval between end moments of two grant-free resource units that are consecutive in time domain. Further, as shown in FIG. 2B, the grant-free resource may be an aperiodic resource. Aperiodic resources are consecutive or uninterrupted in time domain. Optionally, the aperiodic resource may also include grant-free resource units. Different from that in the periodic resource, a time interval between two consecutive grant-free resource units is equal to 0.

The grant-free resource unit may further include several time units having finer-granularity time lengths, and the time unit may be not limited to a millisecond (ms), a symbol, a slot, or the like.

For example, one grant-free resource unit may include eight slots or 10 slots. Alternatively, one grant-free resource unit may include 8 ms or 10 ms. Alternatively, one grant-free resource unit may include (8×14) symbols or (10×14) symbols.

Therefore, a receive end for sidelink communication uses a DRX mode or a non-DRX mode. This actually describes a mode in which the receive end monitors a grant-free resource.

For example, the DRX mode means that the receive end for sidelink communication does not need to continuously monitor the grant-free resource. The grant-free resource may include monitoring duration and sleep duration. The receive end monitors the grant-free resource only in the monitoring duration, and enters a sleep state without performing monitoring in the sleep duration.

The non-DRX mode means that the receive end for sidelink communication continuously monitor the grant-free resource.

The network device needs to configure DRX-related parameters for the terminal devices, so that the terminal devices implement DRX in the unlicensed band, for example, a sidelink unlicensed band or a Uu link unlicensed band.

In an implementation, these DRX-related parameters of the terminal devices may be sent by the network device to the terminal devices by using RRC signaling. The RRC signaling is specific to the UE. In other words, the RRC signaling is signaling dedicated to the UE. However, in a sidelink scenario, to ensure a same DRX operation between the terminal devices, the network device needs to configure a same DRX-related parameter for the terminal devices that establish the sidelink.

For ease of description, the DRX-related parameters are referred to as DRX parameters below.

Optionally, the DRX parameters may include a continuous monitoring parameter P and a preset threshold. The monitoring parameter P and the preset threshold are used by the sidelink receive end to determine a mode used to monitor the grant-free resource, for example, the DRX mode or the non-DRX mode.

In an example, when the preset threshold is used for the sidelink, the preset threshold may be a detection threshold Pd of a sidelink received signal strength indicator (SL-RSSI); or when the preset threshold is used for the Uu link, the preset threshold may be a detection threshold of a Uu link received signal strength indicator (RSSI).

As described above, this application may provide technical solutions for implementing DRX in a plurality of sidelink scenarios. Descriptions are provided below one by one.

In the following descriptions, a receive end that performs sidelink communication is referred to as a first terminal apparatus, and a transmit end that performs sidelink communication is referred to as a second terminal apparatus.

Manner 1

The first terminal apparatus monitors a grant-free resource, and switches between a non-DRX mode and a DRX mode when a preset condition is met.

As described above, the grant-free resource may include grant-free resource units, and the grant-free resource units may be consecutive or periodic in time domain. The first terminal apparatus may monitor the grant-free resource in a form of grant-free resource units.

It may be understood that two or more terminal devices that perform communication through a sidelink may monitor the grant-free resource units in the non-DRX mode by default after a connection is established. In a process of monitoring the grant-free resource in the non-DRX mode, if a condition for switching to the DRX mode is met, the terminal devices switch from the non-DRX mode to the DRX mode.

In an example, the first terminal apparatus monitors the grant-free resource units in the non-DRX mode. The first terminal apparatus switches from the non-DRX mode to the DRX mode in a case in which the first terminal apparatus does not detect, in P consecutive grant-free resource units, a sidelink signal corresponding to the first terminal apparatus and/or a downlink signal corresponding to the first terminal apparatus.

Herein, the sidelink signal corresponding to the first terminal apparatus may be a sidelink signal whose destination address is the first terminal apparatus and that is received on a sidelink established by the first terminal apparatus, for example, a sidelink signal, from the second terminal apparatus, whose destination address is a receiver address of the first terminal apparatus.

The downlink signal corresponding to the first terminal apparatus may be a downlink signal whose destination address is the receiver address of the first terminal apparatus and that is sent by a network device accessed by the first terminal apparatus.

The first terminal apparatus monitors the grant-free resource units, and switches between the DRX mode and the non-DRX mode when the preset condition is met.

In some implementations, the first terminal apparatus switches from the non-DRX mode to the DRX mode when one of the following conditions is met.

Preset condition 1: The first terminal apparatus detects, in the P consecutive grant-free resource units, the sidelink signal corresponding to the first terminal apparatus and/or the downlink signal corresponding to the first terminal apparatus, but a destination receiver address of the sidelink signal and/or a destination receiver address of the downlink signal are/is different from the receiver address of the first terminal apparatus.

It should be noted that, that the destination receiver address of the sidelink signal is different from the receiver address of the first terminal apparatus indicates that the sidelink signal is not sent to the first terminal apparatus. Similarly, that the destination receiver address of the downlink signal is different from the receiver address of the first terminal apparatus indicates that the downlink signal is not sent to the first terminal apparatus.

Preset condition 2: The first terminal apparatus does not detect, in the P consecutive grant-free resource units, the sidelink signal corresponding to the first terminal apparatus or the downlink signal corresponding to the first terminal apparatus, and RSSIs of the P consecutive grant-free resource units are less than a preset threshold.

In a process in which the first terminal apparatus monitors the grant-free resource units in the non-DRX mode, if either the preset condition 1 or the preset condition 2 is met, the condition for switching from the non-DRX mode to the DRX mode is met. In this case, the first terminal apparatus switches to the DRX mode in a $(p+1)^{th}$ grant-free resource unit.

Specifically, the network device configures a grant-free resource for a sidelink receive end (corresponding to the first terminal apparatus) and a sidelink transmit end (corresponding to the second terminal apparatus). The first terminal apparatus monitors the grant-free resource units in the non-DRX mode. The first terminal apparatus switches from the non-DRX mode to the DRX mode in a case in which the first terminal apparatus does not detect, in the P consecutive grant-free resource units, the sidelink signal of the first terminal apparatus or the downlink signal of the first terminal apparatus.

Certainly, if the grant-free resource configured by the network device is used for implementing DRX on a Uu link, the first terminal apparatus monitors the downlink signal in the non-DRX mode. The first terminal apparatus switches from the non-DRX mode to the DRX mode in a case in which the first terminal apparatus does not detect the downlink signal of the first terminal apparatus in the P consecutive grant-free resource units.

In the non-DRX mode, when monitoring a grant-free resource unit, the first terminal apparatus may perform signal monitoring in partial or entire duration of the grant-free resource unit. If the first terminal apparatus performs signal monitoring in the partial duration of the grant-free resource unit, the partial duration is referred to as first monitoring duration in this specification.

When the first monitoring duration is equal to the entire duration of the grant-free resource unit, the first terminal apparatus performs signal monitoring in the entire duration of the grant-free resource unit. When the first monitoring duration is equal to the partial duration of the grant-free resource unit, the first terminal apparatus performs signal monitoring in the first monitoring duration, and may perform, in duration other than the first monitoring duration of the grant-free resource unit, an operation different from a sleep operation. For example, the first terminal apparatus may send an uplink signal or a sidelink signal in the duration other than the first monitoring duration.

In the DRX mode, a grant-free resource unit includes monitoring duration and sleep duration. The monitoring duration of the grant-free resource unit in the DRX mode is referred to as second monitoring duration in this specification.

It should be noted that the terminal apparatus neither monitors (or receives) the downlink signal and the sidelink signal nor sends an uplink signal or the sidelink signal in the sleep duration.

In addition, it should be noted that, in the non-DRX mode, in the duration other than the first monitoring duration of the grant-free resource unit, the terminal apparatus does not perform signal monitoring, but may send the uplink signal or the sidelink signal. This is different from a case of the sleep duration in the DRX mode.

Optionally, a value relationship between the first monitoring duration and the second monitoring duration is not limited in this specification. For example, the first monitoring duration may be equal to, greater than, or less than the second monitoring duration.

Optionally, the second monitoring duration may be partial duration of the grant-free resource unit, that is, the second monitoring duration is less than the duration of the grant-free resource unit.

In some embodiments, the grant-free resource unit may include a plurality of time units in time domain. The time unit may be a millisecond, a symbol, a slot, or the like. The second monitoring duration may include a part of the plurality of time units. Total duration of remaining time units other than the second monitoring duration in the plurality of time units is the sleep duration.

As described above, the grant-free resource unit may include the several time units, and the time unit is not limited to a millisecond, a symbol, a slot, or the like.

Herein, the second monitoring duration is used as the partial duration of the grant-free resource unit, or the second monitoring duration may include the part of the several time units.

For example, the second monitoring duration is the first T milliseconds, the first T symbols, or the first T slots of the grant-free resource unit, where $T \geq 1$, and T is less than a quantity of time units included in the grant-free resource unit.

Figure 3:
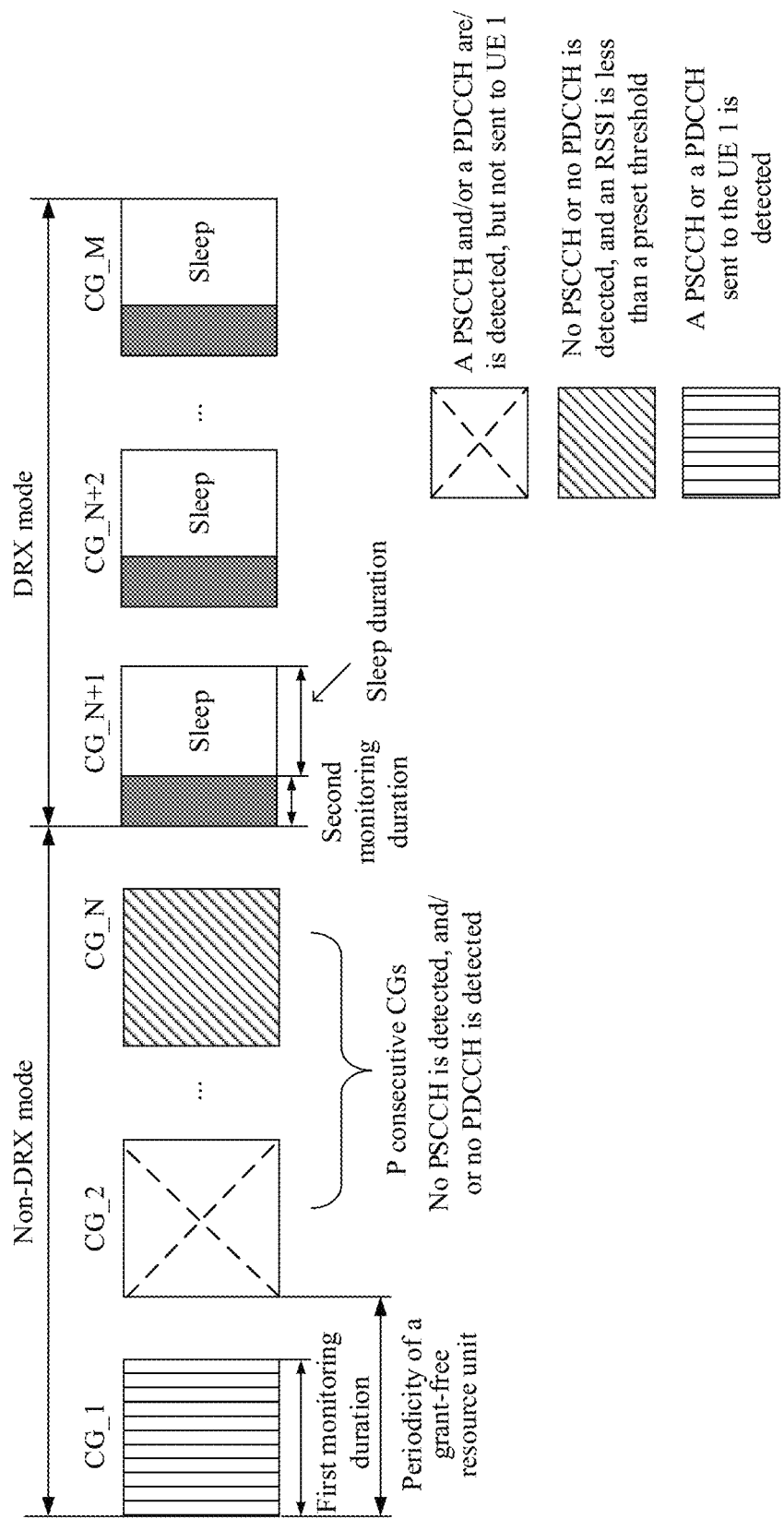
FIG. 3 shows an example of DRX in an unlicensed band according to this application.

With reference to FIG. 3, the following provides an example in which a terminal device monitors a grant-free resource unit in a non-DRX mode, and switches from the non-DRX mode to a DRX mode when a preset condition is met.

In the example in FIG. 3, a grant-free resource may be used for sidelink communication and Uu link communication. Therefore, that a first terminal apparatus monitors a grant-free resource unit includes monitoring a sidelink signal and a downlink signal. In addition, it is assumed that thresholds of a sidelink RSSI and a Uu link RSSI are respectively a threshold 1 and a threshold 2.

FIG. 3 shows an example of DRX in an unlicensed band according to this application. As shown in FIG. 3, it is assumed that the first terminal apparatus is in the non-DRX mode, and a network device configures periodic grant-free resource units for the first terminal apparatus and a second terminal apparatus. A grant-free resource unit is represented as a CG. According to the foregoing definitions of the non-DRX mode on the sidelink, in the non-DRX mode, the first terminal apparatus performs signal monitoring in first monitoring duration of each grant-free resource unit.

In the example in FIG. 3, the first monitoring duration is equal to entire duration of the grant-free resource unit. In FIG. 3, the first terminal apparatus is denoted as UE 1.

Based on the example in FIG. 3, if the UE 1 detects, in first monitoring duration of a CG_1, a sidelink signal corresponding to the UE 1 and/or a downlink signal corresponding to the UE 1, the UE 1 remains in the non-DRX mode in a CG_2. The UE 1 continues to monitor, in first monitoring duration of the CG_2, whether there is a sidelink signal and/or a downlink signal sent to the UE 1. It is assumed that the UE 1 does not detect, in the CG_2, the sidelink signal or the downlink signal sent to the UE 1. In this case, the UE 1 remains in the non-DRX mode in a CG_3. If the UE 1 detects the sidelink signal or the downlink signal in a total of P CGs from the CG_2 to a CG_N, but a destination receiver address of the sidelink signal or a destination receiver address of the downlink signal is not an address of the UE 1, or if the UE 1 does not detect the sidelink signal or the downlink signal in the P CGs, SL-RSSIs are less than the preset threshold 1 of the SL-RSSIs, and Uu link RSSIs are less than the preset threshold 2 of the Uu link RSSIs, the UE 1 switches to the DRX mode in a CG_N+1.

It should be understood that, if the grant-free resource is used only for sidelink communication, the first terminal apparatus needs to switch from the non-DRX mode to the DRX mode only when the first terminal apparatus does not detect the sidelink signal in the P consecutive grant-free resource units and the SL-RSSIs are less than the threshold 1.

For another example, if the grant-free resource is used only for sidelink communication, the first terminal apparatus needs to switch from the non-DRX mode to the DRX mode only when the first terminal apparatus does not detect the downlink signal in the P consecutive grant-free resource units and the Uu link RSSIs are less than the threshold 2.

In the DRX mode, the UE 1 performs signal monitoring only in second monitoring duration of the CG_N+1. If the UE 1 does not detect, in the second monitoring duration, the sidelink signal or the downlink signal sent to the UE 1, the UE 1 stops signal monitoring and enters a sleep state in sleep duration of the CG_N+1. The UE 1 remains in the DRX mode in a CG_N+2, that is, performs signal monitoring in second monitoring duration of the CG_N+2. If the UE 1 does not detect, in the second monitoring duration of the CG_N+2, the sidelink signal or the downlink signal sent to the UE 1, the UE 1 stops signal monitoring and enters a sleep state in sleep duration of the CG_N+2. The rest may be deduced by analogy, and details are not described again.

In FIG. 3, from the CG_N+1 to a CG_M, the UE 1 remains in the DRX mode to perform signal monitoring.

Figure 4:
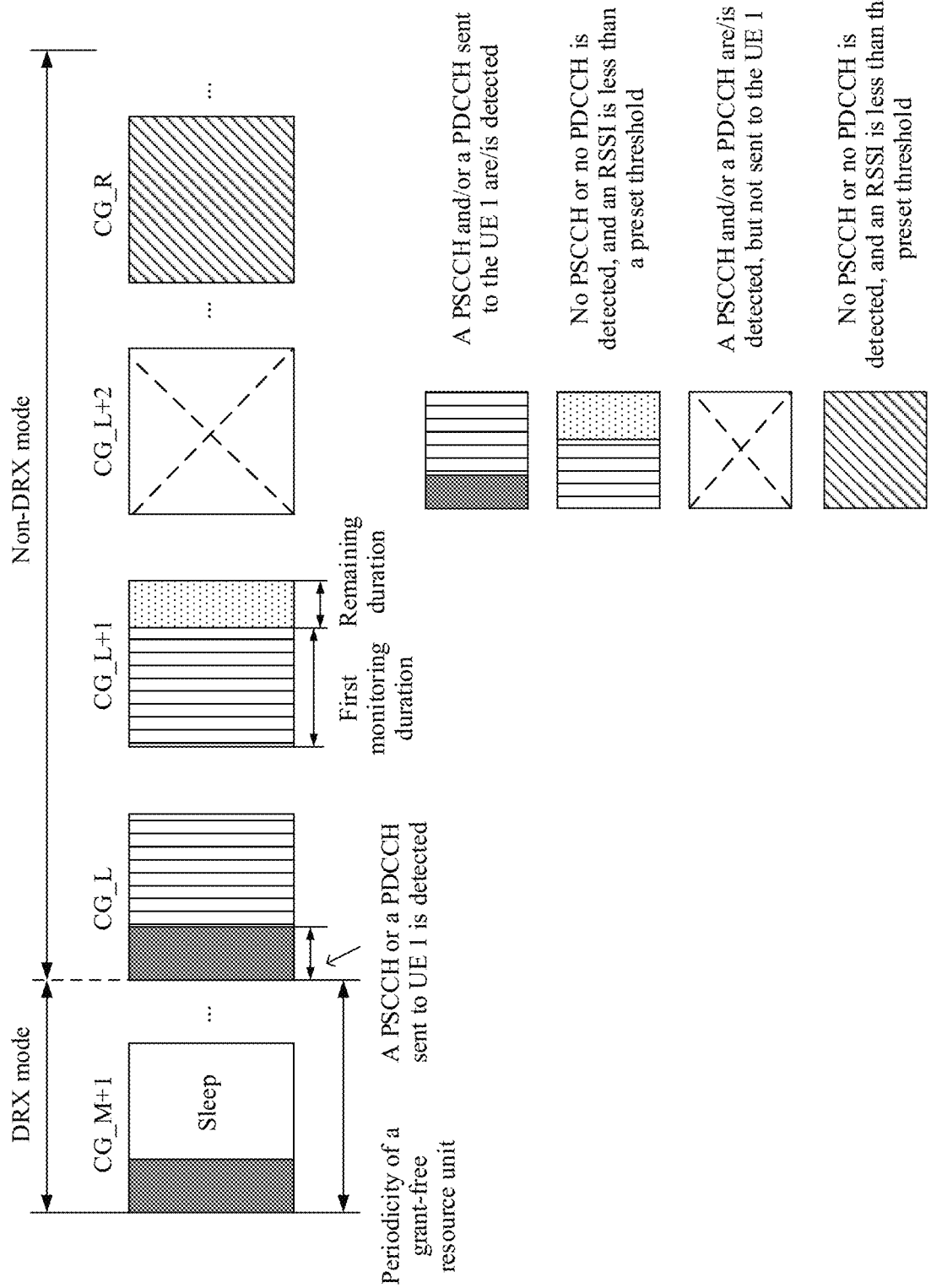
FIG. 4 shows an example in which UE switches between a DRX mode and a non-DRX mode.

The UE 1 monitors the grant-free resource units in the DRX mode, and then switches from the DRX mode to the non-DRX mode until a condition for switching from the DRX mode to the non-DRX mode is met, as shown in FIG. 4.

FIG. 4 shows an example in which UE switches between a DRX mode and a non-DRX mode. As shown in FIG. 4, in the DRX mode, UE 1 performs signal monitoring in second monitoring duration of a CG. If the UE 1 does not detect, in the second monitoring duration, a sidelink signal or a downlink signal corresponding to the UE 1, the UE 1 stops monitoring in sleep duration of the CG. It is assumed that, starting from a CG_M+1, the UE 1 does not detect, in second monitoring duration of the CG_M+1, the sidelink signal or the downlink signal sent to the UE 1. In this case, the UE1 stops signal monitoring in sleep duration of the CG_M+1. The UE 1 remains in the DRX mode in a CG_M+2. The rest may be deduced by analogy. It is assumed that the UE 1 detects, in second monitoring duration of a CG_L, the sidelink signal and/or the downlink signal corresponding to the UE 1. After the second monitoring duration of the CG_L ends, the UE 1 no longer enters a sleep state, but continues to monitor the CG_L until the monitoring duration is equal to first monitoring duration. In this case, the UE1 switches from the DRX mode to the non-DRX mode.

It may be understood that, if first monitoring duration of a grant-free resource unit configured by the network device in the non-DRX mode is different from second monitoring duration of a grant-free resource unit configured by the network device in the DRX mode, the UE 1 needs to switch from the second monitoring duration to the first monitoring duration when switching from the DRX mode to the non-DRX mode.

In another implementation, the first monitoring duration may be equal to the second monitoring duration. In this implementation, in a case in which the UE 1 detects, in second monitoring duration of a CG_L, a sidelink signal and/or a downlink signal corresponding to the UE 1, the UE 1 switches from the DRX mode to the non-DRX mode after the second monitoring duration ends.

It can be learned that, in the DRX mode, the UE 1 switches to the non-DRX mode provided that the UE 1 detects, in second monitoring duration of a CG, the sidelink signal or the downlink signal corresponding to the UE 1.

In addition, as shown in FIG. 4, in the non-DRX mode, the first monitoring duration is a part of the grant-free resource unit. The UE 1 performs signal monitoring in the first monitoring duration. If the UE 1 detects the sidelink signal and/or the downlink signal in the first monitoring duration, the UE 1 may perform an operation different from a sleep operation, for example, send an uplink signal or the sidelink signal, in remaining duration of the grant-free resource unit.

Figure 8:
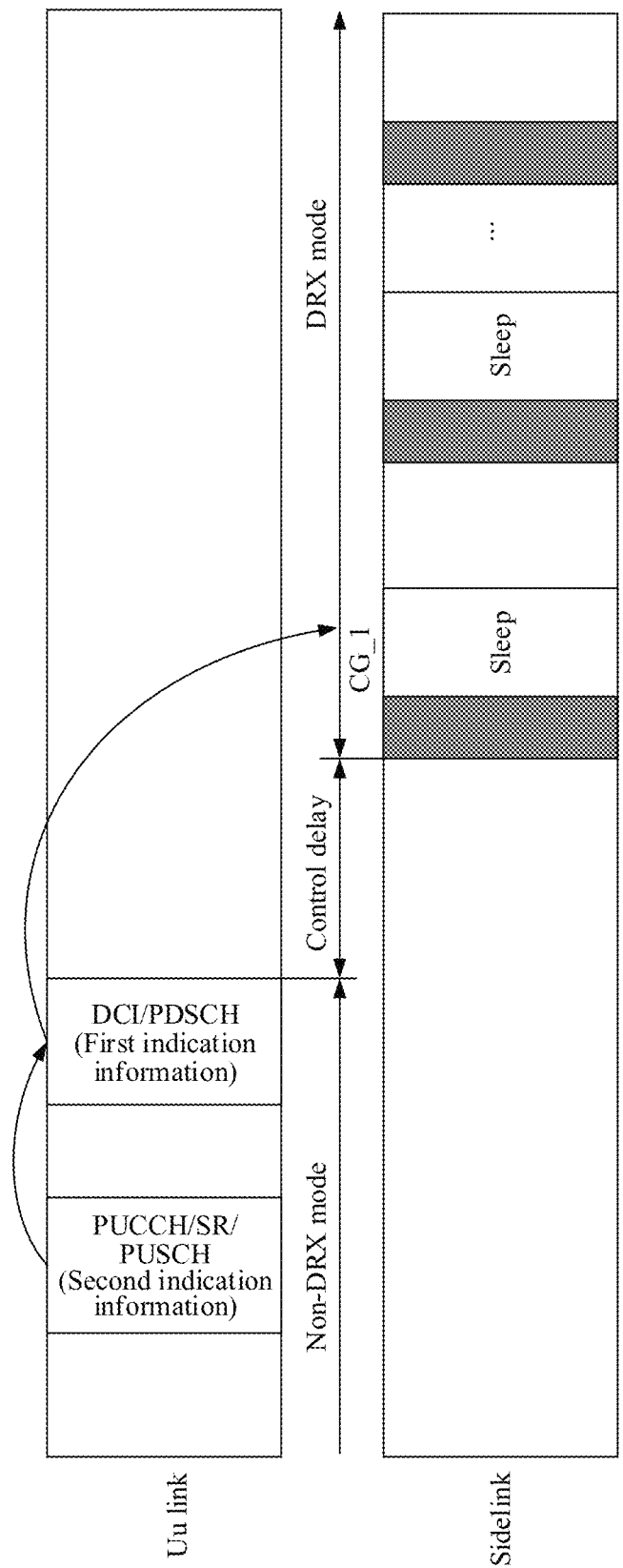
FIG. 8 shows an example of implementing DRX in an unlicensed band in manner 3.

It should be noted that an example in which a grant-free resource is a CG resource is used in FIG. 3, FIG. 4, and the following FIG. 8. Therefore, a grant-free resource unit is marked as a CG in figures. According to the foregoing descriptions of the grant-free resource, the grant-free resource may alternatively be configured as a resource different from the CG resource, or may be in another form. Therefore, FIG. 3, FIG. 4, and FIG. 8 should not constitute any limitation on the grant-free resource in this application.

In the manner 1, the receive end device monitors, in the grant-free resource unit configured by the network device, whether there is a sidelink signal or a downlink signal sent to the receive end device, and may switch between the DRX mode and the non-DRX mode based on a monitoring result and the preset condition. Because the receive end device may use the DRX mode, the receive end device does not need to continuously monitor the grant-free resource, so that power consumption of the receive end device is reduced.

In addition, in the solution of the manner 1, the receive end device determines, by monitoring the grant-free resource, to use the DRX mode or the non-DRX mode. Therefore, it is not considered whether the receive end device and the transmit end device are in network coverage. In other words, the manner 1 is applicable to a scenario in which both the receive end device and the transmit end device are in the network coverage, a scenario in which either the receive end device or the transmit end device is in the network coverage, and a scenario in which neither the receive end device nor the transmit end device is in the network coverage.

An existing cellular network technology supports data transmission between a network device and a terminal device. In addition, the existing cellular network technology further supports sidelink data transmission. For example, both LTE and NR support the SL. However, the SL does not support a low power consumption operation of a terminal device. In other words, after a sidelink is established between two terminal devices, the terminal devices need to continuously monitor a channel until the established connection is disconnected. To reduce power consumption of the terminal device, it is considered to apply a DRX mode of a Uu link to the sidelink.

In a low power consumption mode of the Uu link, the terminal device may enter a sleep state at some time, so that the terminal device does not monitor a physical downlink control channel (PDCCH). When the terminal device needs to monitor the PDCCH, the terminal device wakes up from the sleep state to monitor the PDCCH. Because the terminal device does not need to continuously monitor the channel, power consumption of the terminal device is reduced.

All existing DRX modes are implemented based on a timer. Specifically, the network device configures a DRX parameter for the terminal device, and the terminal device needs to monitor the PDCCH in configured on-duration. If the terminal device detects the PDCCH in this period, the terminal device needs to start a timer, and continues to monitor the PDCCH after the timer is started. If the terminal device does not detect the PDCCH again, the terminal device enters a sleep mode.

However, it is unfeasible to directly apply the DRX mode between the network device and the terminal device to the SL. Because sidelink communication complies with an LBT mechanism, and LBT is uncertain, if the receive end determines a signal transmission status of the transmit end based on a timer, the signal transmission status may be incorrectly determined in most cases, resulting in a data loss and the like. Consequently, quality of sidelink communication is severely affected. It can be learned that it is unfeasible to directly apply the DRX mechanism of the Uu link to the sidelink.

In a scenario in which a communication device (for example, the terminal device or the network device) works in the unlicensed band, that the receive end device does not detect the sidelink signal or the downlink signal may not indicate that the transmit end device has no signal to send. In consideration of this, in the manner 1, with reference to a feature of the sidelink in this application, when the receive end performs signal monitoring on the grant-free resource configured by the network device, in addition to determining whether the sidelink signal or the downlink signal is detected, the receive end device further needs to determine signal received energy on the grant-free resource units in the case in which the receive end device does not detect the sidelink signal or the downlink signal. In this way, the following case can be avoided: When the transmit end device fails to send a signal due to a listen before talk (LBT) failure, the receive end device incorrectly determines that the transmit end device has no signal to send, and incorrectly switches to the DRX mode, resulting in a signal or data loss. Therefore, accuracy of determining the signal transmission status of the transmit end by the receive end can be improved.

In the foregoing manner 1, switching between the DRX mode and the non-DRX mode is that the receive end device monitors, on the grant-free resource, signal transmission statuses of the transmit end device and the network device, to determine to use the DRX mode or the non-DRX mode. The following describes some other implementations, for example, the following manner 2 and manner 3.

Manner 2

The second terminal apparatus indicates the first terminal apparatus to perform mode switching.

Figure 5:
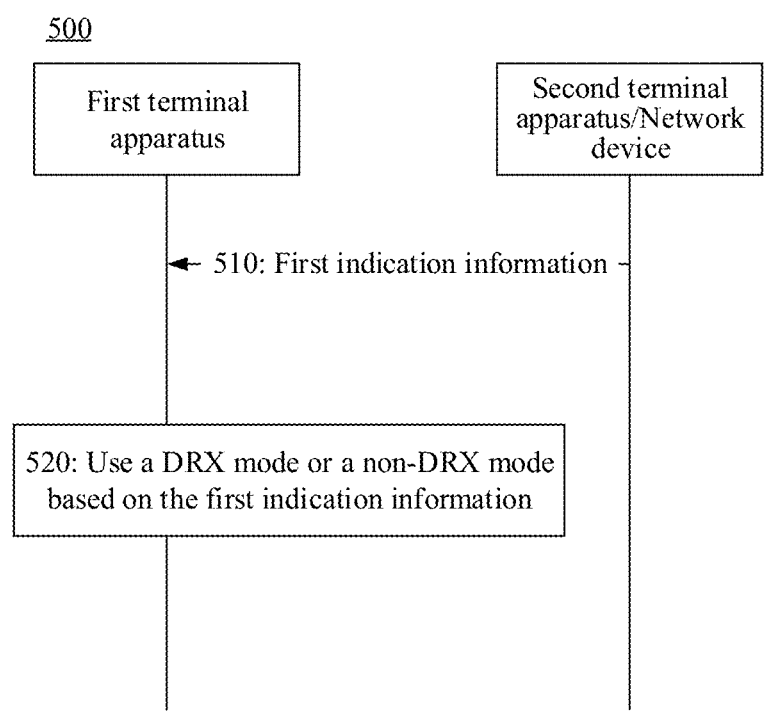
FIG. 5 is a schematic flowchart of implementing DRX in an unlicensed band in manner 2.

FIG. 5 is a schematic flowchart of implementing DRX in an unlicensed band in the manner 2.

510: The second terminal apparatus sends first indication information to the first terminal apparatus, where the first indication information indicates the first terminal apparatus to use a DRX mode or a non-DRX mode.

For descriptions of the DRX mode and the non-DRX mode, refer to the descriptions in the manner 1. Details are not described again.

520: The first terminal apparatus uses the DRX mode or the non-DRX mode based on the first indication information.

It should be noted that, that the first terminal receives the first indication information from the second terminal apparatus includes a plurality of possible scenarios.

In a possible scenario, the first terminal apparatus and the second terminal apparatus perform sidelink communication. For example, neither the first terminal apparatus nor the second terminal apparatus establishes a connection to a network device; only the second terminal apparatus (namely, a transmit end device) establishes a connection to a network device; the first terminal apparatus and the second terminal apparatus establish connections to different network devices; or the first terminal apparatus and the second terminal apparatus establish connections to a same network device, but synchronization between the two terminal apparatuses is required. In these scenarios, before the first terminal apparatus and the second terminal apparatus perform sidelink communication, the second terminal apparatus sends a sidelink-synchronization signal block (SL-SSB) to the first terminal apparatus, where the SL-SSB carries the first indication information, and the first indication information indicates the first terminal apparatus to use the non-DRX mode or the DRX mode.

In NR, the SL-SSB includes a primary synchronization signal (PSS), a secondary synchronization signal (SSS), and a physical broadcast channel (PBCH). Optionally, the first indication information may be carried in the PBCH of the SL-SSB. For example, the PBCH carries one bit, where 0 indicates the non-DRX mode, and 1 indicates the DRX mode; or 1 indicates the non-DRX mode, and 0 indicates the DRX mode.

The first terminal apparatus receives the SL-SSB from the second terminal apparatus, and obtains the first indication information in the PBCH. The first terminal apparatus uses the non-DRX mode or the DRX mode based on the first indication information.

Optionally, if the first indication information indicates the non-DRX mode, the first terminal apparatus monitors a grant-free resource unit in the non-DRX mode after synchronizing with the second terminal apparatus; or if the first indication information indicates the DRX mode, the first terminal apparatus monitors a grant-free resource unit in the DRX mode after synchronizing with the second terminal apparatus.

Optionally, the SL-SSB may be sent by the second terminal apparatus in a process of synchronizing with the first terminal apparatus, or may be sent by the second terminal apparatus after synchronizing with and establishing a connection to the first terminal apparatus. This is not limited.

Optionally, in another scenario, after a sidelink is established between the first terminal apparatus and the second terminal apparatus, the second terminal apparatus indicates, by using the first indication information, the first terminal apparatus to use the DRX mode or the non-DRX mode.

Optionally, in an embodiment, after the sidelink is established between the second terminal apparatus and the first terminal apparatus, the second terminal apparatus sends the first indication information to the first terminal apparatus by using PC5-radio resource control (PC5-RRC) signaling. In other words, the first indication information is carried in the PC5-RRC signaling for sending.

It should be understood that PC5 is an interface between terminal devices.

For example, the second terminal apparatus sends the PC5-RRC signaling to the first terminal apparatus, where the PC5-RRC signaling carries the first indication information, and the first indication information indicates the first terminal apparatus to use the non-DRX mode or the DRX mode.

The first terminal apparatus receives the first indication information from the second terminal apparatus on the sidelink, and determines, based on the first indication information, to use the DRX mode or the non-DRX mode subsequently.

Figure 6:
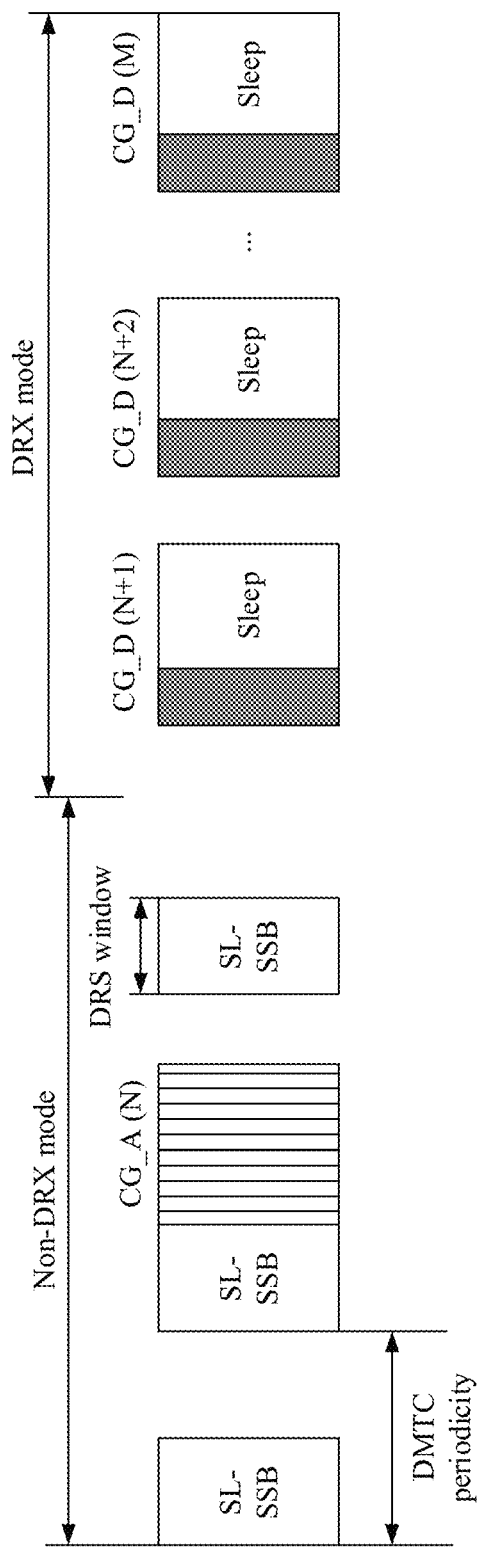
FIG. 6 shows an example of indicating, by using an SL-SSB, a receive end to use a DRX mode or a non-DRX mode.

With reference to FIG. 6, an example in which an SL-SSB carries first indication information is used below to describe indicating, by the second terminal apparatus, the DRX mode or the non-DRX mode to the first terminal apparatus.

FIG. 6 shows an example of indicating, by using the SL-SSB, the receive end to use the DRX mode or the non-DRX mode. As shown in FIG. 6, the second terminal apparatus sends the SL-SSB in a transmit window of the SL-SSB. The first terminal apparatus receives the SL-SSB in the window of the SL-SSB in the non-DRX mode. The first terminal apparatus demodulates the SL-SSB. If the SL-SSB does not carry the first indication information, or if a PBCH of the SL-SSB carries the first indication information, and the first indication information indicates the non-DRX mode, the first terminal apparatus selects, from grant-free parameters configured by the network device, a group of grant-free parameters corresponding to the non-DRX mode. In FIG. 6, the transmit window of the SL-SSB is represented as a discovery reference signal (DRS) window. A periodicity of the SL-SSB is represented as a discovery reference signal measurement timing configuration (DMTC) periodicity.

It is assumed that the first terminal apparatus receives an SL-SSB in the 1st DRS window after an $N^{th}$ CG (for example, a CG_A shown in FIG. 6), a PBCH of the SL-SSB carries first indication information, and the first indication information indicates the DRX mode. The first terminal apparatus switches from the non-DRX mode to the DRX mode in an $(N+1)^{th}$ grant-free resource unit.

In FIG. 6, a grant-free resource unit in the non-DRX mode is denoted as a CG_A, and a grant-free resource unit in the DRX mode is denoted as a CG_D.

Optionally, the CG_A and the CG_D may have a same periodicity and size, or may have different periodicities and sizes. For example, the CG_A and the CG_D have a same size but different periodicities. Alternatively, the CG_A and the CG_D have a same periodicity but different sizes. This is not limited in this specification.

In the foregoing embodiment, the second terminal apparatus explicitly indicates the non-DRX mode or the DRX mode to the first terminal apparatus by using the first indication information.

In another embodiment, the first indication information may be implicit. The first indication information may be a first signal or a second signal, and the first signal or the second signal indicates the DRX mode or the non-DRX mode.

In an example, the second terminal apparatus indicates, by using a reference signal used to demodulate the PBCH, that a mode in which the first terminal apparatus monitors a grant-free resource is the non-DRX mode or the DRX mode.

The network device configures two different reference signals for the second terminal apparatus. The two different reference signals are respectively referred to as a first reference signal and a second reference signal below. If the second terminal apparatus sends the first reference signal, it indicates that the second terminal apparatus indicates the first terminal apparatus to use the DRX mode. If the second terminal apparatus sends the second reference signal, it indicates that the second terminal apparatus indicates the first terminal apparatus to use the non-DRX mode.

Optionally, the first reference signal and the second reference signal may be specifically demodulation reference signals (DMRSs), for example, two DMRSs that are configured by the network device for the first terminal apparatus and that are used to demodulate the PBCH in the SL-SSB. The two DMRSs include different reference sequences.

The first terminal apparatus determines a reference sequence of a DMRS through blind detection, to determine to use the non-DRX mode or the DRX mode. For example, if the first terminal apparatus detects a DMRS having a first reference sequence, it indicates that the second terminal apparatus indicates the DRX mode. If the first terminal apparatus detects a DMRS having a second reference sequence, it indicates that the second terminal apparatus indicates the non-DRX mode.

Optionally, in some other embodiments, the second terminal apparatus may implicitly indicate the DRX mode or the non-DRX mode by using a reference signal or signal different from the DMRS.

For example, the network device configures two channel state information reference signals (CSI-RSs) having different reference sequences. One CSI-RS indicates the DRX mode, and the other CSI-RS indicates the non-DRX mode. The first terminal apparatus may determine, based on a reference sequence of a detected CSI-RS, to use the DRX mode or the non-DRX mode.

In the manner 2, the sidelink transmit end actively indicates mode switching of the receive end, so that a switching delay that exists when the receive end determines mode switching by monitoring a signal of the transmit end in the manner 1 can be avoided. Therefore, according to manner 2, the mode switching delay can be effectively reduced.

In the foregoing manner 1 and manner 2, switching between the non-DRX mode and the DRX mode is performed by using an operation of the sidelink. The following further provides a method for assisting, through a Uu link, the sidelink receive end (namely, the first terminal apparatus) in performing mode switching, as shown in the following manner 3.

Manner 3

The second terminal apparatus indicates a DRX mode or a non-DRX mode to a network device through a Uu link between the second terminal apparatus and the network device. After learning of a mode indicated by the second terminal apparatus, the network device notifies, through a Uu link between the network device and the first terminal apparatus, the first terminal apparatus of the mode indicated by the second terminal apparatus.

Figure 7:
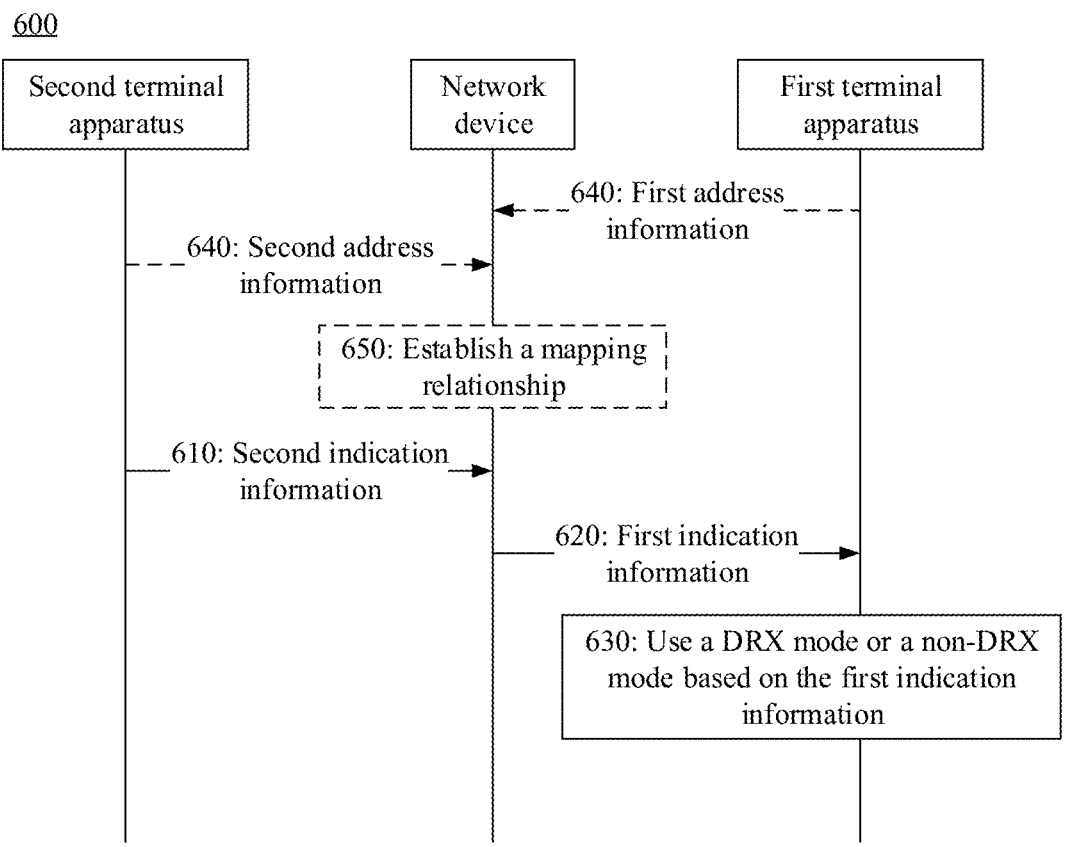
FIG. 7 is another schematic flowchart of DRX in an unlicensed band according to this application.

FIG. 7 is another schematic flowchart of implementing DRX according to this application.

610: The second terminal apparatus sends second indication information to the network device, where the second indication information indicates the first terminal apparatus to use the DRX mode or the non-DRX mode.

The network device receives the second indication information from the second terminal apparatus, and determines the mode indicated by the second terminal apparatus.

620: The network device sends first indication information to the first terminal apparatus, where the first indication information indicates the DRX mode or the non-DRX mode.

The first terminal apparatus receives the first indication information from the network device.

630: The first terminal apparatus uses the DRX mode or the non-DRX mode based on the first indication information.

It can be found from the procedure shown in FIG. 7 that the manner 3 is applicable to a scenario in which both the first terminal apparatus and the second terminal apparatus are in network coverage.

In the procedure in FIG. 7, the first terminal apparatus and the second terminal apparatus separately establish a Uu link to the network device. In addition, the first terminal apparatus and the second terminal apparatus need to register sidelink physical layer address information, namely, sidelink layer_1 address information, of the first terminal apparatus and the second terminal apparatus with the network device.

The network device in the procedure in FIG. 7 is an access network device of the first terminal apparatus and the second terminal apparatus.

That a terminal apparatus registers sidelink physical layer address information with the network device means that the terminal apparatus provides the sidelink physical layer address information of the terminal apparatus for the access network device.

For ease of description, the sidelink physical layer address information of the first terminal apparatus is referred to as first address information, and the sidelink physical layer address information of the second terminal apparatus is referred to as second address information.

Before that the network device receives the second indication information from the second terminal apparatus, a method 600 further includes step 640 and step 650.

640: The first terminal apparatus sends the first address information of the first terminal apparatus to the network device, and the second terminal apparatus sends the second address information of the second terminal apparatus to the network device.

The network device separately receives the first address information from the first terminal apparatus and the second address information from the second terminal apparatus.

650: The network device establishes a mapping relationship among Uu link physical layer address information of the first terminal apparatus, Uu link physical layer address information of the second terminal apparatus, the first address information, and the second address information.

The access network device receives the first address information of the first terminal apparatus and the second address information of the second terminal apparatus, and then establishes a correspondence between the first address information and the second address information based on the Uu link physical layer address information of the first terminal apparatus and the Uu link physical layer address information of the second terminal apparatus.

It should be noted that, when the first terminal apparatus and the second terminal apparatus access a network, the access network device may obtain the Uu link physical layer address information of the first terminal apparatus and the Uu link physical layer address information of the second terminal apparatus. However, the access network device does not know the sidelink physical layer address information of the first terminal apparatus and the sidelink physical layer address information of the second terminal apparatus.

In a process in which the second terminal apparatus indicates the DRX mode or the non-DRX mode to the first terminal apparatus, after the access network device receives the second indication information from the second terminal apparatus, and establishes a mapping relationship between Uu link physical layer address information and sidelink physical layer address information, the access network device may determine the sidelink physical layer address information of the second terminal apparatus based on address information of a Uu link physical layer on which the second indication information is received. In this way, the access network device may determine, based on the mapping relationship, the sidelink physical layer address information of a terminal apparatus (namely, the first terminal apparatus) that establishes a sidelink to the second terminal apparatus, and finally determine the Uu link physical layer address information of the first terminal apparatus. Finally, the access network device sends the first indication information, where a receiver address of the first indication information is the Uu link physical layer address information of the first terminal apparatus.

After the mapping relationship is established, when the second terminal apparatus needs to indicate the first terminal apparatus to perform mode switching, the second terminal apparatus may notify the network device of the mode of the first terminal apparatus. The network device receives a notification message from the second terminal apparatus, determines, based on the mapping relationship, the first address information corresponding to the second address information of the second terminal apparatus, and indicates the mode to the first terminal apparatus corresponding to the first address information. In this way, the first terminal apparatus can also switch between the non-DRX mode and the DRX mode.

Similar to the specific implementations of the first indication information described above, the second indication information may be explicit or implicit. Details are separately described below.

(1) The second indication information explicitly indicates the DRX mode or the non-DRX mode.

In an embodiment, the second terminal apparatus sends a first-type PUCCH to the network device, where the first-type PUCCH carries the second indication information, and the second indication information indicates the DRX mode or the non-DRX mode.

In another embodiment, the second terminal apparatus sends a PUSCH to the network device, where the PUSCH carries the second indication information.

Optionally, the second indication information may be carried in a MAC CE of the PUSCH. The "MAC CE" may be configured by the network device, may be specified in a standard protocol, or may be negotiated or agreed on by the network device and the terminal device.

In this embodiment, because the PUSCH is scheduled by the network device, the network device may determine, based on a resource location at which the PUSCH is received, an address of the terminal device that sends the PUSCH. Therefore, the network device may determine a Uu link RNTI address of the second terminal apparatus. Then, the network device may determine a Uu link RNTI address of a sidelink receive end (namely, the first terminal apparatus) based on sidelink address information registered by the second terminal apparatus and the mapping relationship. Further, the network device notifies the first terminal apparatus of the non-DRX mode or the DRX mode indicated by the second terminal apparatus.

(2) The second indication information implicitly indicates the DRX mode or the non-DRX mode.

In an embodiment, the second terminal apparatus sends the second indication information to the network device, where the second indication information is a first scheduling request (SR) or a second SR, the first SR indicates the DRX mode, and the second SR indicates the non-DRX mode. The first SR and the second SR include different reference sequences.

In another embodiment, the second terminal apparatus sends the second indication information to the network device, where the second indication information is a second-type first PUCCH or a second-type second PUCCH, the first PUCCH indicates the DRX mode, and the second PUCCH indicates the non-DRX mode. The first PUCCH and the second PUCCH include different reference sequences.

In this specification, the first-type PUCCH may be a PUCCH that fully occupies one slot in time domain, and the second-type PUCCH may be a PUCCH that does not fully occupy one slot in time domain. Therefore, the first-type PUCCH may also be referred to as a long PUCCH, and the second-type PUCCH may also be referred to as a short PUCCH.

In the foregoing implicit indication manners, the network device receives one of the foregoing signals, and learns of the RNTI address of the corresponding sidelink receive end and the mode to which the receive end needs to be switched. Further, the sidelink receive end may be notified by using the following method.

In an embodiment, the network device sends DCI to the first terminal apparatus, where the DCI is scrambled by using the RNTI address of the first terminal apparatus, the DCI carries the first indication information, and the first indication information indicates the non-DRX mode or the DRX mode.

The first terminal apparatus receives the DCI, descrambles the DCI by using the RNTI address of the first terminal apparatus, and obtains the first indication information in the DCI, to determine the non-DRX mode or the DRX mode indicated by the second terminal apparatus.

In another embodiment, the network device sends DCI to the first terminal apparatus, where the DCI is scrambled by using the RNTI address of the first terminal apparatus, the DCI is used to schedule a PDSCH, and the PDSCH carries the first indication information.

The first terminal apparatus receives the DCI, and descrambles the DCI by using the RNTI address of the first terminal apparatus. Further, the first terminal apparatus receives the PDSCH based on the DCI, and obtains the first indication information in the PDSCH, to determine the DRX mode or the non-DRX mode indicated by the second terminal apparatus.

FIG. 8 shows an example of implementing DRX in an unlicensed band in the manner 3. As shown in FIG. 8, the second terminal apparatus first sends second indication information to the network device through a Uu link. The second indication information may be carried in a first-type PUSCH, or the second indication information may be specifically a second-type first PUSCH, a second PUSCH, a first SR, an SR, or the like. The second indication information indicates a DRX mode or a non-DRX mode. The network device receives the second indication information from the second terminal apparatus through the Uu link, and learns of the DRX mode or the non-DRX mode indicated by the second terminal apparatus.

Further, the network device sends first indication information to the first terminal apparatus through a Uu link. The first indication information indicates the first terminal apparatus to use the DRX mode or the non-DRX mode. The first indication information may be carried in DCI, a PDSCH scheduled by DCI, or the like.

The first terminal apparatus receives the first indication information from the network device through the Uu link, and switches from the non-DRX mode to the DRX mode if the first indication information indicates the DRX mode.

Optionally, in some other examples, the network device may alternatively include the first indication information in an SSB or RRC signaling, to indicate the DRX mode or the non-DRX mode to the first terminal apparatus.

It is assumed that the first terminal apparatus uses the non-DRX mode before receiving the first indication information, and switches to the DRX mode in a CG_1 after receiving the first indication information.

Optionally, the Uu link shown in FIG. 8 may work in an licensed band and/or an unlicensed band. The sidelink may work in an unlicensed band. For example, both the first indication information and the second indication information may be sent in a Uu link licensed band, or may be sent in an unlicensed band. Alternatively, one of the first indication information and the second indication information is sent in a licensed band, and the other is sent in an unlicensed band. This is not limited.

It may be understood that, in the manner 3, the first terminal apparatus is indicated, with assistance of the Uu link, to use the DRX mode or the non-DRX mode. However, when the network device sends an indication to the first terminal apparatus by using the DCI or the PDSCH, there is a specific delay, for example, a control delay shown in FIG. 8.

In the manner 3, with assistance of the Uu link established in the licensed band, the sidelink transmit end forwards the first indication information through the network device. This can avoid the following disadvantage: The indication information that indicates mode switching of the first terminal apparatus cannot be sent in a timely manner because LBT performed by the transmit end on the sidelink fails. Therefore, the mode switching delay can be reduced.

In the foregoing manner 2 and manner 3, the first terminal apparatus determines, based on the received first indication information, to use the DRX mode or the non-DRX mode subsequently.

In different implementations, the network device may separately configure a grant-free resource in the DRX mode and a grant-free resource in the non-DRX mode. For example, the network device configures two groups of grant-free parameters. In the two groups of grant-free parameters, one group of grant-free parameters corresponds to the DRX mode, and the other group of grant-free parameters corresponds to the non-DRX mode.

If the first indication information indicates the first terminal apparatus to use the DRX mode, the first terminal apparatus selects the group of grant-free parameters corresponding to the DRX mode; or if the first indication information indicates the first terminal apparatus to use the non-DRX mode, the first terminal apparatus selects the other group of grant-free parameters corresponding to the non-DRX mode.

The grant-free parameters mainly include a periodicity of a grant-free resource unit and monitoring duration of the grant-free resource unit.

For example, the grant-free parameters corresponding to the non-DRX mode include duration and a periodicity of a grant-free resource unit and first monitoring duration of the grant-free resource unit. The grant-free parameters corresponding to the DRX mode includes duration and a periodicity of a grant-free resource unit and second monitoring duration of the grant-free resource unit.

It may be understood that, in the DRX mode, the network device configures the duration of the grant-free resource unit and the second monitoring duration, so that sleep duration can be obtained. However, the network device may configure the duration of the grant-free resource unit, the second monitoring duration, and the sleep duration. This is limited.

In addition, in any one of the manner 1 to the manner 3, the network device configures the grant-free parameters corresponding to the DRX mode and the grant-free parameters corresponding to the non-DRX mode, and delivers the grant-free parameters corresponding to the DRX mode and the grant-free parameters corresponding to the non-DRX mode to the terminal device that establishes the sidelink.

After switching to a mode, the sidelink receive end selects to use a group of grant-free parameters corresponding to a currently used mode (namely, the DRX mode or the non-DRX mode).

Alternatively, the foregoing two groups of grant-free parameters are a grant-free resource in the DRX mode and a grant-free resource in the non-DRX mode. In other words, one group of grant-free parameters is the grant-free resource in the DRX mode, and the other group of grant-free parameters is the grant-free resource in the non-DRX mode.

The methods for implementing DRX provided in this application are described above in detail. The following describes a communication apparatus provided in this application.

Figure 9:
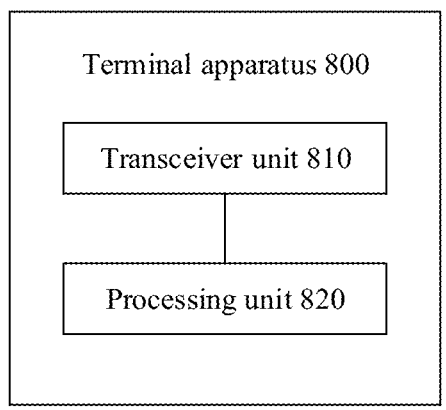
FIG. 9 is a schematic diagram of a structure of a terminal apparatus 800 according to this application.

FIG. 9 is a schematic diagram of a structure of a terminal apparatus 800 according to this application. As shown in FIG. 9, the terminal apparatus 800 includes a transceiver unit 810 and a processing unit 820.

In an implementation, the terminal apparatus 800 corresponds to the first terminal apparatus in the manner 1 in the foregoing method embodiments. In this case, the following describes functions of the units of the terminal apparatus 800.

The transceiver unit 810 is configured to monitor P grant-free resource units in a non-DRX mode, where the non-DRX mode is that the transceiver unit 810 performs signal monitoring in first monitoring duration of the P grant-free resource units.

The processing unit 820 is configured to control the transceiver unit 810 to switch from the non-DRX mode to a DRX mode in a case in which the transceiver unit 810 does not detect, in the P consecutive grant-free resource units, a sidelink signal corresponding to the terminal apparatus and/or a downlink signal corresponding to the terminal apparatus, where the grant-free resource units each include second monitoring duration and sleep duration in the DRX mode, the DRX mode is that the terminal apparatus performs signal monitoring in the second monitoring duration, and stops monitoring in the sleep duration in a case in which the transceiver unit 810 does not detect, in the second monitoring duration, the sidelink signal corresponding to the terminal apparatus and/or the downlink signal corresponding to the terminal apparatus, $P \geq 1$, and P is an integer.

In an embodiment, the case in which the transceiver unit 810 does not detect a sidelink signal corresponding to the terminal apparatus and/or a downlink signal corresponding to the terminal apparatus is one or more of the following:

the transceiver unit 810 detects, in the P consecutive grant-free resource units, the sidelink signal corresponding to the terminal apparatus and/or the downlink signal corresponding to the terminal apparatus, and a destination address of the sidelink signal and/or a destination address of the downlink signal are/is different from an address of the terminal apparatus; or the transceiver unit 810 does not detect, in the P consecutive grant-free resource units, the sidelink signal corresponding to the terminal apparatus and/or the downlink signal corresponding to the terminal apparatus, and received signal strength of the P consecutive grant-free resource units is less than a preset threshold.

In an embodiment, the processing unit 820 is further configured to:

control the transceiver unit 810 to monitor grant-free resource units in the DRX mode; and control the transceiver unit 810 to switch from the DRX mode to the non-DRX mode in a case in which the transceiver unit 810 detects, in the second monitoring duration, the sidelink signal corresponding to the terminal apparatus and/or the downlink signal corresponding to the terminal apparatus.

In an embodiment, the grant-free resource units each include a plurality of time units in time domain, the second monitoring duration includes a part of the plurality of time units, and the time unit is any one of the following: a millisecond, a symbol, or a slot.

In another implementation, the terminal apparatus 800 corresponds to the first terminal apparatus in the manner 2 or the manner 3 in the foregoing method embodiments. In this case, the following describes functions of the units of the terminal apparatus 800.

The transceiver unit 810 is configured to receive first indication information, where the first indication information indicates the terminal apparatus to use a non-DRX mode or a DRX mode.

The non-DRX mode is that the terminal apparatus performs signal monitoring in first monitoring duration of a grant-free resource unit, and the DRX mode is that the terminal apparatus performs signal monitoring in second monitoring duration of the grant-free resource unit, and stops monitoring in sleep duration of the grant-free resource unit in a case in which the terminal apparatus does not detect, in the second monitoring duration, a sidelink signal corresponding to the terminal apparatus and/or a downlink signal corresponding to the terminal apparatus.

The processing unit 820 is configured to control, based on the first indication information, the transceiver unit 810 to use the DRX mode or the non-DRX mode.

In an embodiment, the first indication information is carried in an SSB, RRC, a MAC CE of a PDSCH, or DCI from a network device.

In an embodiment, the first indication information is carried in an SL-SSB or PC5-RRC signaling from a second terminal apparatus.

In an embodiment, the first indication information is a first signal or a second signal, the first signal indicates the terminal apparatus to use the DRX mode, and the second signal indicates the terminal apparatus to use the non-DRX mode.

In an embodiment, the first signal is a first DMRS, the second signal is a second DMRS, and the first DMRS and the second DMRS include different reference sequences.

In an embodiment, the processing unit 820 is further configured to register sidelink physical layer address information of the terminal apparatus with the network device.

The sidelink physical layer address information is sidelink layer_1 address information.

Optionally, the terminal apparatus 800 may be a receive end device in sidelink communication. For example, the terminal apparatus 800 may completely correspond to the first terminal apparatus in the method embodiments. The transceiver unit 810 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 820 may be a processing apparatus.

Optionally, the terminal apparatus 800 may be a circuit system installed in a first terminal apparatus. The circuit system may be a chip, an integrated circuit, a system on chip (SoC), or the like. In this case, the transceiver unit 810 may be a communication interface. For example, the transceiver unit 810 may be an input/output interface or an interface circuit. An input/output interface may include an input interface and an output interface. The interface circuit may include an input interface circuit and an output interface circuit. The processing unit 820 may be a processing circuit.

A function of the processing apparatus may be implemented by hardware, or may be implemented by hardware executing corresponding software. For example, the processing apparatus may include one or more memories and one or more processors. The one or more memories are configured to store a computer program. The one or more processors read and execute the computer program stored in the one or more memories, to enable the terminal apparatus 800 to perform operations and/or processing performed by the first terminal apparatus in the method embodiments.

Optionally, the processing apparatus may alternatively include only one or more processors. One or more memories are located outside the processing apparatus. The one or more processors are connected to the one or more memories by using a circuit/wire, to read and execute the computer program stored in the memories.

Optionally, in an embodiment, the transceiver unit 810 may be a radio frequency apparatus in the terminal apparatus, and the processing unit 820 may be a baseband apparatus.

Figure 10:
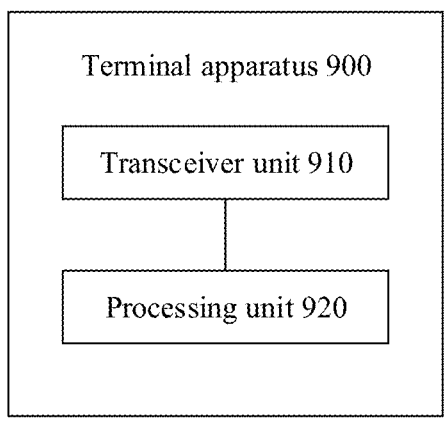
FIG. 10 is a schematic diagram of a structure of a terminal apparatus 900 according to this application.

FIG. 10 is a schematic diagram of a structure of a terminal apparatus 900 according to this application. As shown in FIG. 10, the terminal apparatus 900 includes a transceiver unit 910 and a processing unit 920.

The transceiver unit 910 is configured to send first indication information or second indication information, where the first indication information or the second indication information indicates a first terminal apparatus to use a non-DRX mode or a DRX mode.

The non-DRX mode is that the first terminal apparatus performs signal monitoring in first monitoring duration of a grant-free resource unit, and the DRX mode is that the first terminal apparatus performs signal monitoring in second monitoring duration of the grant-free resource unit, and stops monitoring in sleep duration of the grant-free resource unit in a case in which the first terminal apparatus does not detect, in the second monitoring duration, a sidelink signal corresponding to the first terminal apparatus and/or a downlink signal corresponding to the first terminal apparatus.

In an embodiment, the first indication information is carried in an SL-SSB or PC5-RRC signaling sent by the transceiver unit 910.

In an embodiment, the second indication information is carried in a MAC CE of a PUSCH sent by the transceiver unit 910 or a first-type PUCCH.

In an embodiment, the second indication information is a first signal or a second signal, the first signal indicates the first terminal apparatus to use the DRX mode, and the second signal indicates the first terminal apparatus to use the non-DRX mode.

In an embodiment, the first signal is a first DMRS, the second signal is a second DMRS, and the first DMRS and the second DMRS include different reference sequences.

In an embodiment, the first signal is a second-type first PUCCH, the second signal is a second-type second PUCCH, and the first PUCCH and the second PUCCH include different reference sequences.

In an embodiment, the first signal is a first SR, the second signal is a second SR, and the first SR and the second SR include different reference sequences.

In an embodiment, the processing unit 920 is configured to register sidelink physical layer address information of the terminal apparatus with a network device.

The sidelink physical layer address information is sidelink layer_1 address information.

Optionally, the terminal apparatus 900 may be a transmit end device in sidelink communication. For example, the terminal apparatus 900 may completely correspond to the second terminal apparatus in the method embodiments. The transceiver unit 910 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 920 may be a processing apparatus.

Optionally, the terminal apparatus 900 may be a circuit system installed in a second terminal apparatus. The circuit system may be a chip, an integrated circuit, a system on chip (SoC), or the like. In this case, the transceiver unit 910 may be a communication interface. For example, the transceiver unit 910 may be an input/output interface or an interface circuit. An input/output interface may include an input interface and an output interface. The interface circuit may include an input interface circuit and an output interface circuit. The processing unit 920 may be a processing circuit.

A function of the processing apparatus may be implemented by hardware, or may be implemented by hardware executing corresponding software. For example, the processing apparatus may include one or more memories and one or more processors. The one or more memories are configured to store a computer program. The one or more processors read and execute the computer program stored in the one or more memories, to enable the terminal apparatus 900 to perform operations and/or processing performed by the second terminal apparatus in the method embodiments.

Optionally, the processing apparatus may alternatively include only one or more processors. One or more memories are located outside the processing apparatus. The one or more processors are connected to the one or more memories by using a circuit/wire, to read and execute the computer program stored in the memories.

Optionally, in an embodiment, the transceiver unit 910 may be a radio frequency apparatus in the terminal apparatus, and the processing unit 920 may be a baseband apparatus.

Figure 11:
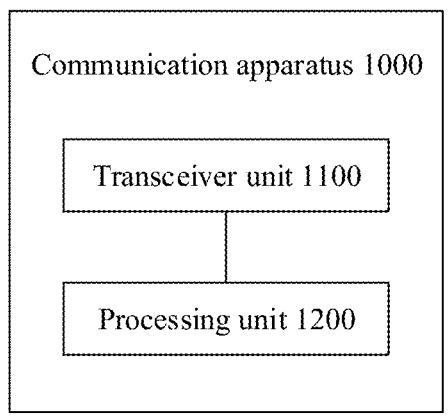
FIG. 11 is a schematic diagram of a structure of a communication apparatus 1000 according to this application.

FIG. 11 is a schematic diagram of a structure of a communication apparatus 1000 according to this application. As shown in FIG. 11, the communication apparatus 1000 includes a transceiver unit 1100 and a processing unit 1200.

The transceiver unit 1100 is configured to receive second indication information from a second terminal apparatus, where the second indication information indicates a first terminal apparatus to use a non-DRX mode or a DRX mode.

The non-DRX mode is that the first terminal apparatus performs signal monitoring in first monitoring duration of a grant-free resource unit, and the DRX mode is that the first terminal apparatus performs signal monitoring in second monitoring duration of the grant-free resource unit, and stops monitoring in sleep duration of the grant-free resource unit in a case in which the first terminal apparatus does not detect, in the second monitoring duration, a sidelink signal corresponding to the first terminal apparatus and/or a downlink signal corresponding to the first terminal apparatus.

The processing unit 1200 is further configured to control, based on the second indication information received by the transceiver unit 1100, the transceiver unit 1100 to send first indication information to the first terminal apparatus, where the first indication information indicates the non-DRX mode or the DRX mode.

In an embodiment, the second indication information is carried in a PUSCH from the second terminal apparatus, a MAC CE of the PUSCH, or a first-type PUCCH.

In an embodiment, the second indication information is a first signal or a second signal, the first signal indicates the first terminal apparatus to use the DRX mode, and the second signal indicates the first terminal apparatus to use the non-DRX mode.

The transceiver unit 1100 is configured to send the first indication information to the first terminal apparatus when receiving the first signal from the second terminal apparatus, where the first indication information indicates the DRX mode.

Alternatively, the transceiver unit 1100 is configured to send the first indication information to the first terminal apparatus when receiving the second signal from the second terminal apparatus, where the first indication information indicates the non-DRX mode.

In an embodiment, the first signal is a second-type first PUCCH, the second signal is a second-type second PUCCH, and the first PUCCH and the second PUCCH include different reference sequences.

In an embodiment, the first signal is a first SR, the second signal is a second SR, and the first SR and the second SR include different reference sequences.

In an embodiment, the transceiver unit 1100 is configured to receive first address information of a sidelink physical layer from the first terminal apparatus and second address information of a sidelink physical layer from the second terminal apparatus.

The processing unit 1200 is further configured to establish a mapping relationship among the first address information, the second address information, air interface link physical layer address information of the first terminal apparatus, and air interface link physical layer address information of the second terminal apparatus.

In addition, the processing unit 1200 is further configured to: determine the second address information based on address information of an air interface link physical layer on which the transceiver unit 1100 receives the second indication information; and determine, based on the second address information and the mapping relationship, the first address information corresponding to the second address information.

The transceiver unit 1100 is further configured to send the first indication information to the first terminal apparatus corresponding to the first address information determined by the processing unit 1200.

The air interface link physical layer address information is Uu link layer_1 address information, and the sidelink physical layer address information is sidelink layer_1 address information.

In an embodiment, the first indication information is carried in DCI or a PDSCH sent by the transceiver unit 1100.

Optionally, the communication apparatus 1000 may be a network device, for example, an access network device. The communication apparatus 1000 may completely correspond to the network device in the method embodiments. The transceiver unit 1100 may be a transceiver. The transceiver may be replaced with a receiver or a transmitter. For example, when performing a sending action, the transceiver may be replaced with the transmitter. When performing a receiving action, the transceiver may be replaced with the receiver. The processing unit 1200 may be a processing apparatus, for example, a processor.

Optionally, the communication apparatus 1000 may be a circuit system installed in the network device. The circuit system may be a chip, an integrated circuit, a system on chip (SoC), or the like. In this case, the transceiver unit 1100 may be a communication interface. For example, the transceiver unit 1100 may be an input/output interface or an interface circuit. An input/output interface may include an input interface and an output interface. The interface circuit may include an input interface circuit and an output interface circuit. The processing unit 1200 may be a processing circuit.

A function of the processing apparatus may be implemented by hardware, or may be implemented by hardware executing corresponding software. For example, the processing apparatus may include one or more memories and one or more processors. The one or more memories are configured to store a computer program. The one or more processors read and execute the computer program stored in the one or more memories, to enable the communication apparatus 1000 to perform operations and/or processing performed by the network device in the method embodiments.

Optionally, the processing apparatus may alternatively include only one or more processors. One or more memories are located outside the processing apparatus. The one or more processors are connected to the one or more memories by using a circuit/wire, to read and execute the computer program stored in the memories.

Optionally, in an embodiment, the transceiver unit 1100 may be a radio frequency apparatus in the network device, and the processing unit 1200 may be a baseband apparatus.

Figure 12:
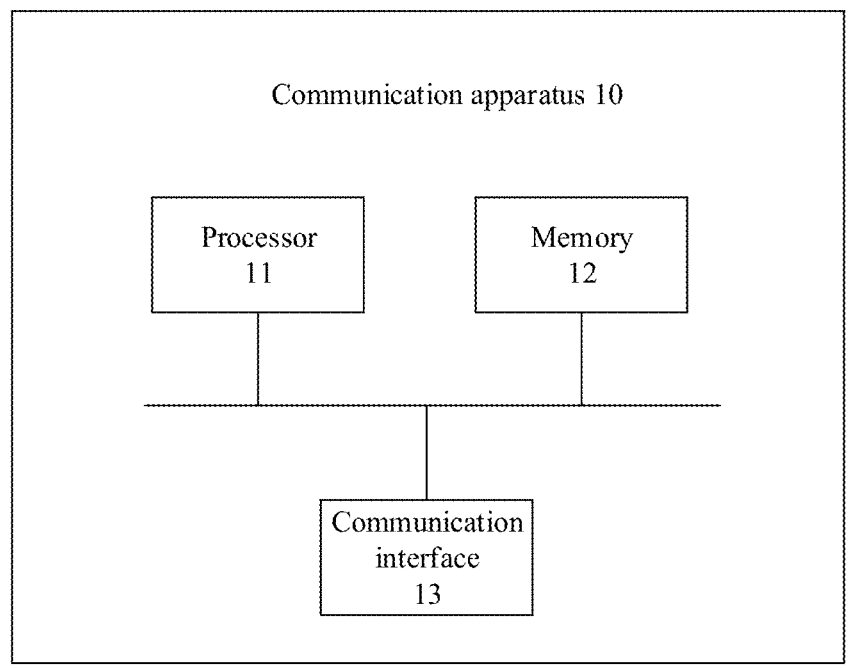
FIG. 12 is a schematic diagram of a structure of a terminal apparatus 10 according to this application.

FIG. 12 is a schematic diagram of a structure of a terminal apparatus 10 according to this application. As shown in FIG. 12, the terminal apparatus 10 includes one or more processors 11, one or more memories 12, and one or more communication interfaces 13. The processor 11 is configured to control the communication interface 13 to send and receive a signal. The memory 12 is configured to store a computer program. The processor 11 is configured to invoke the computer program from the memory 12 and run the computer program, to enable the terminal apparatus 10 to perform processing and/or operations performed by the first terminal apparatus in the method embodiments of this application.

For example, the processor 11 may have a function of the processing unit 820 shown in FIG. 9, and the communication interface 13 may have a function of the transceiver unit 810 shown in FIG. 9. For operations and/or processing performed by the processor 11, refer to the descriptions of the processing unit 820 in FIG. 9. For operations and/or processing performed by the communication interface 13, refer to the descriptions of the transceiver unit 810.

In other words, the processing unit 810 in the apparatus embodiment may be replaced with the processor 11, and the transceiver unit 820 in the apparatus embodiment may be replaced with the communication interface 13.

Figure 13:
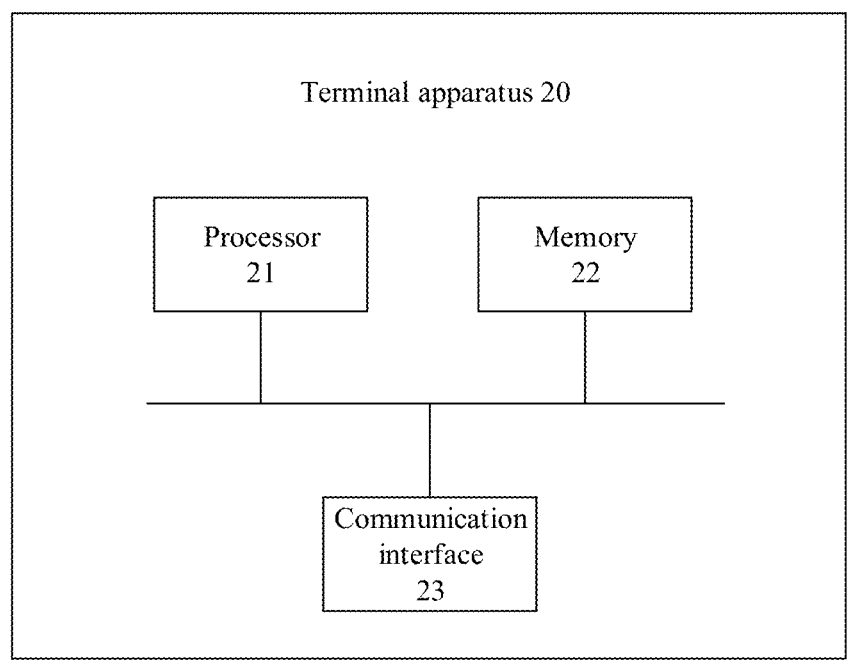
FIG. 13 is a schematic diagram of a structure of a terminal apparatus 20 according to this application.

FIG. 13 is a schematic diagram of a structure of a terminal apparatus 20 according to this application. As shown in FIG. 13, the terminal apparatus 20 includes one or more processors 21, one or more memories 22, and one or more communication interfaces 23. The processor 21 is configured to control the communication interface 23 to send and receive a signal. The memory 22 is configured to store a computer program. The processor 21 is configured to invoke the computer program from the memory 22 and run the computer program, to enable the terminal apparatus 20 to perform processing and/or operations performed by the second terminal apparatus in the method embodiments of this application.

For example, the processor 21 may have a function of the processing unit 920 shown in FIG. 10, and the communication interface 23 may have a function of the transceiver unit 910 shown in FIG. 10. For operations and/or processing performed by the processor 21, refer to the descriptions of the processing unit 920 in FIG. 10. For operations and/or processing performed by the communication interface 23, refer to the descriptions of the transceiver unit 910.

In other words, the processing unit 910 in the apparatus embodiment may be replaced with the processor 21, and the transceiver unit 920 in the apparatus embodiment may be replaced with the communication interface 23.

Optionally, in an embodiment, the processor 21 may be a baseband apparatus in a second terminal device, and the communication interface 23 may be a radio frequency apparatus in the second terminal device.

Figure 14:
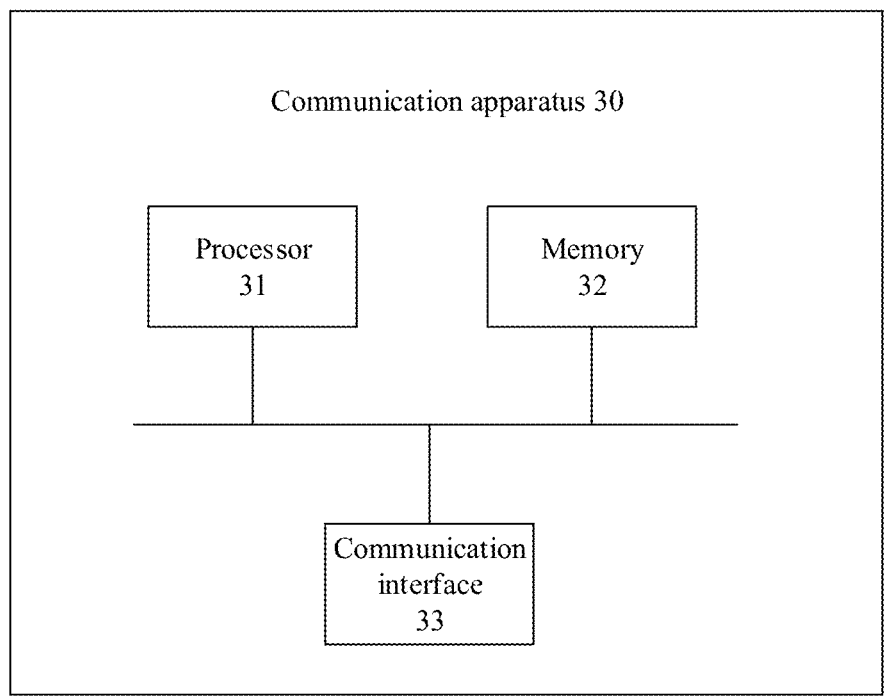
FIG. 14 is a schematic diagram of a structure of a communication apparatus 30 according to this application.

FIG. 14 is a schematic diagram of a structure of a communication apparatus 30 according to this application. As shown in FIG. 14, the communication apparatus 30 includes one or more processors 31, one or more memories 32, and one or more communication interfaces 33. The processor 31 is configured to control the communication interface 33 to send and receive a signal. The memory 32 is configured to store a computer program. The processor 31 is configured to invoke the computer program from the memory 32 and run the computer program, to enable the communication apparatus 30 to perform processing and/or operations performed by the network device in the method embodiments of this application.

For example, the processor 31 may have a function of the processing unit 1200 shown in FIG. 11, and the communication interface 33 may have a function of the transceiver unit 1100 shown in FIG. 11. For operations and/or processing performed by the processor 31, refer to the descriptions of the processing unit 1200 in FIG. 11. For operations and/or processing performed by the communication interface 33, refer to the descriptions of the transceiver unit 1100.

In other words, the processing unit 1100 in the apparatus embodiment may be replaced with the processor 31, and the transceiver unit 1200 in the apparatus embodiment may be replaced with the communication interface 33.

Optionally, the processor 31 may be a baseband apparatus in the network device, and the communication interface 33 may be a radio frequency apparatus in the network device.

Optionally, the memory and the processor in the foregoing apparatus embodiments may be physically independent units, or the memory may be integrated with the processor.

In addition, this application further provides a computer-readable storage medium. The computer-readable storage medium stores computer instructions. When the computer instructions are run on a computer, the computer is enabled to perform operations and/or processing performed by the first terminal apparatus in the method for DRX in an unlicensed band provided in this application.

This application further provides a computer-readable storage medium. The computer-readable storage medium stores computer instructions. When the computer instructions are run on a computer, the computer is enabled to perform operations and/or processing performed by the second terminal apparatus in the method for DRX in an unlicensed band provided in this application.

This application further provides a computer-readable storage medium. The computer-readable storage medium stores computer instructions. When the computer instructions are run on a computer, the computer is enabled to perform operations and/or processing performed by the network device in the method for DRX in an unlicensed band provided in this application.

This application further provides a computer program product. The computer program product includes computer program code. When the computer program code is run on a computer, the computer is enabled to perform operations and/or processing performed by the first terminal apparatus in the method for DRX in an unlicensed band provided in this application.

This application further provides a computer program product. The computer program product includes computer program code. When the computer program code is run on a computer, the computer is enabled to perform operations and/or processing performed by the second terminal apparatus in the method for DRX in an unlicensed band provided in this application.

This application further provides a computer program product. The computer program product includes computer program code. When the computer program code is run on a computer, the computer is enabled to perform operations and/or processing performed by the network device in the method for DRX in an unlicensed band provided in this application.

This application further provides a terminal apparatus. The terminal apparatus includes a processor and an interface circuit. The interface circuit is configured to: receive computer code or instructions, and transmit the computer code or the instructions to the processor. The processor is configured to run the computer code or the instructions, to perform operations and/or processing performed by the first terminal apparatus in the method for DRX in an unlicensed band provided in this application.

This application further provides a terminal apparatus. The terminal apparatus includes a processor and an interface circuit. The interface circuit is configured to: receive computer code or instructions, and transmit the computer code or the instructions to the processor. The processor is configured to run the computer code or the instructions, to perform operations and/or processing performed by the second terminal apparatus in the method for DRX in an unlicensed band provided in this application.

This application further provides a communication apparatus. The communication apparatus includes a processor and an interface circuit. The interface circuit is configured to: receive computer code or instructions, and transmit the computer code or the instructions to the processor. The processor is configured to run the computer code or the instructions, to perform operations and/or processing performed by the network device in the method for DRX in an unlicensed band provided in this application.

This application further provides a chip. The chip includes one or more processors. The one or more processors are configured to execute a computer program stored in one or more memories, to perform operations and/or processing performed by the first terminal apparatus in any method embodiment. The one or more memories configured to store the computer program are independently disposed outside the chip.

Further, the chip may further include one or more communication interfaces. The one or more communication interfaces may be one or more input/output interfaces, one or more input/output circuits, or the like. Further, the chip may further include the one or more memories.

This application further provides a chip. The chip includes one or more processors. The one or more processors are configured to execute a computer program stored in one or more memories, to perform operations and/or processing performed by the second terminal apparatus in any method embodiment. The one or more memories configured to store the computer program are independently disposed outside the chip.

Further, the chip may further include one or more communication interfaces. The one or more communication interfaces may be one or more input/output interfaces, one or more input/output circuits, or the like. Further, the chip may further include the one or more memories.

This application further provides a chip. The chip includes one or more processors. The one or more processors are configured to execute a computer program stored in one or more memories, to perform operations and/or processing performed by the network device in any method embodiment. The one or more memories configured to store the computer program are independently disposed outside the chip.

Further, the chip may further include one or more communication interfaces. The one or more communication interfaces may be one or more input/output interfaces, one or more input/output circuits, or the like. Further, the chip may further include the one or more memories.

In addition, this application further provides a wireless communication system. The wireless communication system includes one or more of the first terminal apparatus, the second terminal apparatus, and the network device in embodiments of this application.

The processor mentioned in the foregoing embodiments has a signal processing capability. In an implementation process, the steps in the foregoing method embodiments may be completed by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps in the method disclosed in embodiments of this application may be directly performed and completed by a hardware coding processor, or may be performed and completed by a combination of hardware in the coding processor and a software module. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing method in combination with the hardware of the processor.

The memory in the foregoing embodiments may be a volatile memory or a nonvolatile memory, or may include both a volatile memory and a nonvolatile memory. The nonvolatile memory may be a read-only memory (ROM), a programmable read-only memory (programmable ROM, or PROM), an erasable programmable read-only memory (erasable PROM, or EPROM), an electrically erasable programmable read-only memory (electrically EPROM, or EEPROM), or a flash memory. The volatile memory may be a random access memory (RAM), used as an external cache. Through examples but not limitative description, RAMs in many forms are available, for example, a static random access memory (static RAM, or SRAM), a dynamic random access memory (dynamic RAM, or DRAM), a synchronous dynamic random access memory (synchronous DRAM, or SDRAM), a double data rate synchronous dynamic random access memory (double data rate SDRAM, or DDR SDRAM), an enhanced synchronous dynamic random access memory (enhanced SDRAM, or ESDRAM), a synchlink dynamic random access memory (synchlink DRAM, or SLDRAM), and a direct rambus random access memory (direct rambus RAM, or DRRAM). It should be noted that the memory of the system and method described in this specification includes but is not limited to these memories and any memory of another proper type.

The terms such as "unit", and "system" used in this specification indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within the process and/or the execution thread. The components may be located on one computer and/or distributed between two or more computers. In addition, these components may be executed from various computer-readable media that store various data structures. The components may communicate by using a local and/or remote process based on a signal having one or more data packets (for example, data from two components interacting with another component in a local system, a distributed system, and/or a network such as the Internet interacting with another system by using the signal).

A person of ordinary skill in the art may be aware that units and algorithm steps in the examples described with reference to embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the method described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal apparatus, comprising:
   a transceiver, configured to monitor P grant-free resource units in a non-discontinuous reception mode (non-DRX mode), wherein the non-DRX mode is that the terminal apparatus performs signal monitoring in a first monitoring duration of the P grant-free resource units; and
   a processor, configured to control the transceiver to switch from the non-DRX mode to a discontinuous reception mode (DRX mode) in response to the transceiver not detecting, in the P grant-free resource units, a sidelink signal corresponding to the terminal apparatus or a downlink signal corresponding to the terminal apparatus,
   wherein, in the DRX mode, each grant-free resource unit in the P grant-free resource units comprises a second monitoring duration and a sleep duration, wherein the DRX mode is a mode in which the terminal apparatus performs signal monitoring in the second monitoring duration and stops monitoring in the sleep duration in response to the transceiver not detecting, in the second monitoring duration, the sidelink signal corresponding to the terminal apparatus or the downlink signal corresponding to the terminal apparatus, $P \geq 1$, and P is an integer.

2. The terminal apparatus according to claim 1, wherein the transceiver not detecting the sidelink signal corresponding to the terminal apparatus a or the downlink signal corresponding to the terminal apparatus comprises:
   the transceiver detecting, in the P grant-free resource units, the sidelink signal corresponding to the terminal apparatus or the downlink signal corresponding to the terminal apparatus, and a destination address of the sidelink signal and a destination address of the downlink signal are different from an address of the terminal apparatus; or
   the transceiver not detecting, in the P grant-free resource units, the sidelink signal corresponding to the terminal apparatus or the downlink signal corresponding to the terminal apparatus, and received signal strength indicators (RSSIs) of the P grant-free resource units are less than a preset threshold.

3. The terminal apparatus according to claim 1,
   wherein the transceiver is further configured to monitor the grant-free resource units in the DRX mode; and
   wherein the processor is further configured to control the transceiver to switch from the DRX mode to the non-DRX mode in response to the transceiver detecting, in the second monitoring duration, the sidelink signal corresponding to the terminal apparatus or the downlink signal corresponding to the terminal apparatus.

4. The terminal apparatus according to claim 1, wherein each grant-free resource unit in the P grant-free resource units comprises a plurality of time units in time domain, the second monitoring duration comprises a part of the plurality of time units, and the time unit is any one of the following: a millisecond, a symbol, or a slot.

5. A terminal apparatus, comprising:
   a transceiver, configured to receive first indication information, wherein the first indication information indicates to the terminal apparatus to use a non-discontinuous reception mode (non-DRX mode) or a discontinuous reception mode (DRX mode), wherein the non-DRX mode is a mode in which the terminal apparatus performs signal monitoring in a first monitoring duration of a grant-free resource unit, and the DRX mode is a mode in which the terminal apparatus performs signal monitoring in a second monitoring duration of the grant-free resource unit and stops monitoring in a sleep duration of the grant-free resource unit in response to the terminal apparatus not detecting, in the second monitoring duration, a sidelink signal corresponding to the terminal apparatus or a downlink signal corresponding to the terminal apparatus; and
   a processor, configured to control, based on the first indication information, the transceiver to use the DRX mode or the non-DRX mode.

6. The terminal apparatus according to claim 5, wherein the first indication information is carried in a synchronization signal block (SSB), radio resource control (RRC) signaling, a media access control control element (MAC CE) of a physical downlink shared channel (PDSCH), or downlink control information (DCI) from a network device.

7. The terminal apparatus according to claim 5, wherein the first indication information is carried in a sidelink-synchronization signal block (SL-SSB) or PC5-radio resource control (PC5-RRC) signaling from a second terminal apparatus.

8. The terminal apparatus according to claim 5,
   wherein the first indication information is a first signal or a second signal, wherein the first signal indicates to the terminal apparatus to use the DRX mode, and the second signal indicates to the terminal apparatus to use the non-DRX mode; and
   wherein the processor is further configured to:
     in response to the transceiver receiving the first signal, control the transceiver to use the DRX mode; or in response to the transceiver receiving the second signal, control the transceiver to use the non-DRX mode.

9. The terminal apparatus according to claim 8, wherein the first signal is a first demodulation reference signal (DMRS), the second signal is a second DMRS, and the first DMRS and the second DMRS comprise different reference sequences.

10. The terminal apparatus according to claim 5, wherein the processor is further configured to register sidelink physical layer address information of the terminal apparatus with a network device.

11. A second terminal apparatus, comprising:
a transceiver, configured to send first indication information or second indication information to a first terminal device, wherein the first indication information or the second indication information indicates to the first terminal apparatus to use a non-discontinuous reception mode (non-DRX mode) or a discontinuous reception mode (DRX mode), respectively;
wherein the non-DRX mode is a mode in which the first terminal apparatus performs signal monitoring in a first monitoring duration of a grant-free resource unit, and
wherein the DRX mode is a mode in which the first terminal apparatus performs signal monitoring in a second monitoring duration of the grant-free resource unit and stops monitoring in a sleep duration of the grant-free resource unit in response to the first terminal apparatus not detecting, in the second monitoring duration, a sidelink signal corresponding to the first terminal apparatus or a downlink signal corresponding to the first terminal apparatus.

12. The second terminal apparatus according to claim 11, wherein the first indication information is carried in a sidelink-synchronization signal block (SL-SSB) or PC5-radio resource control (PC5-RRC) signaling sent by the transceiver.

13. The second terminal apparatus according to claim 11, wherein the second indication information is carried in a media access control control element (MAC CE) of a physical uplink shared channel (PUSCH) sent by the transceiver or a first-type physical uplink control channel (PUCCH) that fully occupies one slot in time domain.

14. The second terminal apparatus according to claim 11, wherein the second indication information is a first signal or a second signal, wherein the first signal indicates to the first terminal apparatus to use the DRX mode, and the second signal indicates to the first terminal apparatus to use the non-DRX mode.

15. The second terminal apparatus according to claim 14, wherein the first signal is a first demodulation reference signal (DMRS), the second signal is a second DMRS, and the first DMRS and the second DMRS comprise different reference sequences.

16. The second terminal apparatus according to claim 14, wherein the first signal is a second-type first physical uplink control channel (PUCCH), the second signal is a second-type second PUCCH, the second-type first PUCCH and the second-type second PUCCH comprise different reference sequences and do not fully occupy one slot in time domain.

17. The second terminal apparatus according to claim 14, wherein the first signal is a first scheduling request (SR), the second signal is a second SR, and the first SR and the second SR comprise different reference sequences.

18. The second terminal apparatus according to claim 13, wherein the second terminal apparatus further comprises:
a processor, configured to register sidelink physical layer address information of the second terminal apparatus with a network device.

* * * * *

UNITED STATES PATENT AND TRADEMARK OFFICE
CERTIFICATE OF CORRECTION

PATENT NO. : 12,273,952 B2
APPLICATION NO. : 17/827349
DATED : April 8, 2025
INVENTOR(S) : Fan et al.

It is certified that error appears in the above-identified patent and that said Letters Patent is hereby corrected as shown below:

In the Claims

Claim 2: Column 37, Line 63: "ing to the terminal apparatus a or the downlink signal" should read as -- ing to the terminal apparatus or the downlink signal --.

Signed and Sealed this
Thirtieth Day of September, 2025

John A. Squires
*Director of the United States Patent and Trademark Office*